(12) United States Patent
Guo

(10) Patent No.: US 12,449,524 B2
(45) Date of Patent: Oct. 21, 2025

(54) OBJECT RECOGNITION METHOD AND APPARATUS BASED ON ULTRASONIC ECHOES AND STORAGE MEDIUM

(71) Applicant: Tencent Technology (Shenzhen) Company Limited, Shenzhen (CN)

(72) Inventor: Ziyi Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 442 days.

(21) Appl. No.: 17/992,754

(22) Filed: Nov. 22, 2022

(65) Prior Publication Data

US 2023/0114470 A1 Apr. 13, 2023

Related U.S. Application Data

(63) Continuation of application No. PCT/CN2022/071297, filed on Jan. 11, 2022.

(30) Foreign Application Priority Data

Jan. 19, 2021 (CN) .......................... 202110071159.2

(51) Int. Cl.
*G01S 7/539* (2006.01)
*G01S 15/89* (2006.01)
(Continued)

(52) U.S. Cl.
CPC .............. *G01S 7/539* (2013.01); *G01S 15/89* (2013.01); *G06V 10/751* (2022.01); *G06V 10/774* (2022.01); *G06V 40/161* (2022.01)

(58) Field of Classification Search
CPC . G01S 7/539; G01S 15/89; G01S 7/53; G01S 15/86; G01S 15/88; G06V 10/751;
(Continued)

(56) References Cited

U.S. PATENT DOCUMENTS

2017/0061611 A1* 3/2017 Ito ........................ A61B 6/463
2017/0146342 A1* 5/2017 Feng ..................... G01B 21/04
(Continued)

FOREIGN PATENT DOCUMENTS

CN 201084168 Y 7/2008
CN 101396277 A 4/2009
(Continued)

OTHER PUBLICATIONS

Tencent Technology, ISR, PCT/CN2022/071297, Apr. 11, 2022, 3 pgs.

(Continued)

*Primary Examiner* — Mohammad K Islam
(74) *Attorney, Agent, or Firm* — Morgan, Lewis & Bockius LLP

(57) ABSTRACT

This application discloses an object recognition method and apparatus based on ultrasonic echoes performed by a computer device. The method includes: receiving an echo signal reflected by an object and captured by a terminal, the echo signal corresponding to an ultrasonic signal transmitted by the terminal to the object; extracting an ultrasonic echo feature of the echo signal; performing feature dimension conversion on the ultrasonic echo feature to obtain a target dimension feature; and further, performing image translation to obtain object image information corresponding to the object. Compared with image collection using cameras, the transmission of ultrasonic signals and the reception of reflected echo signals are less sensitive to the changes of scenarios. When image collection is not feasible, physical information carried by ultrasonic echoes can be accurately translated into the image of the object to be identified, thereby ensuring the accuracy of object recognition.

12 Claims, 12 Drawing Sheets

(51) Int. Cl.
  *G06V 10/75* (2022.01)
  *G06V 10/774* (2022.01)
  *G06V 40/16* (2022.01)

(58) Field of Classification Search
  CPC .. G06V 10/774; G06V 40/161; G06V 40/168; G06N 3/0455; G06N 3/084
  See application file for complete search history.

(56) References Cited

U.S. PATENT DOCUMENTS

| | | | |
|---|---|---|---|
| 2020/0025917 A1* | 1/2020 | Kozuki | G01S 15/89 |
| 2020/0160018 A1* | 5/2020 | Panchawagh | H10N 30/857 |
| 2020/0279087 A1* | 9/2020 | Seo | G01S 7/52079 |
| 2020/0320750 A1 | 10/2020 | Yamanaka et al. | |

FOREIGN PATENT DOCUMENTS

| | | |
|---|---|---|
| CN | 105323480 A | 2/2016 |
| CN | 110074813 A | 8/2019 |
| CN | 209231947 U | 8/2019 |
| CN | 209765528 U | 12/2019 |
| CN | 110688957 A | 1/2020 |
| CN | 110780741 A | 2/2020 |
| CN | 111178340 A | 5/2020 |
| CN | 111382644 A | 7/2020 |
| CN | 111444830 A | 7/2020 |
| CN | 111709409 A | 9/2020 |
| DE | 102017108508 A1 | 10/2018 |
| JP | 2000098031 A | 4/2000 |
| WO | WO 2019114580 A1 | 6/2019 |
| WO | WO 2020016449 A1 | 1/2020 |

OTHER PUBLICATIONS

Tencent Technology, Extended European Search Report, EP Patent Application No. EP 22742041.1, Apr. 23, 2024, 15 pgs.
Tencent Technology, WO, PCT/CN2022/071297, Apr. 11, 2022, 5 pgs.
Tencent Technology, IPRP, PCT/CN2022/071297, Jul. 20, 2023, 6 pgs.
Tencent Technology, European Office Action, EP Patent Application No. 22742041.1, Jun. 3, 2025, 5 pgs.

* cited by examiner

OBJECT RECOGNITION METHOD AND APPARATUS BASED ON ULTRASONIC ECHOES AND STORAGE MEDIUM

CROSS-REFERENCE TO RELATED APPLICATIONS

This application is a continuation application of PCT Patent Application No. PCT/CN2022/071297, entitled "OBJECT RECOGNITION METHOD AND APPARATUS BASED ON ULTRASONIC ECHO, AND STORAGE MEDIUM" filed on Jan. 11, 2022, which claims priority to Chinese Patent Application No. 202110071159.2, filed with the State Intellectual Property Office of the People's Republic of China on Jan. 19, 2021, and entitled "OBJECT RECOGNITION METHOD AND APPARATUS BASED ON ULTRASONIC ECHOES AND STORAGE MEDIUM", all of which are incorporated herein by reference in their entirety.

FIELD OF THE TECHNOLOGY

This application relates to the technical field of artificial intelligence, in particular to object recognition based on ultrasonic echoes.

BACKGROUND OF THE DISCLOSURE

With the development of artificial intelligence technologies, object recognition has been widely applied to the fields such as security and finance. During the object recognition, using objects are recognized, such that the accuracy of permission management for application scenarios and the safety performance of terminals are improved.

In related technologies, the object recognition is performed based on image recognition, that is, features of images are extracted by collecting image information of using objects or objects to be recognized, so as to take obtained results as recognition results of the objects.

SUMMARY

In view of this, this application provides an object recognition method based on ultrasonic echoes, which can effectively improve the accuracy of object recognition.

In one aspect, embodiments of this application provide an object recognition method based on ultrasonic echoes, which can be applied to a system or program having an object recognition function based on ultrasonic echoes in a terminal device, and specifically includes:
  transmitting an ultrasonic signal to an object through an acoustic wave transmission apparatus of a terminal;
  receiving an echo signal reflected by the object through an acoustic wave receiving apparatus of the terminal, the echo signal corresponding to the ultrasonic signal;
  extracting an ultrasonic echo feature corresponding to the echo signal;
  performing feature dimension conversion on the ultrasonic echo feature using a target model to obtain a target dimension feature for characterizing the object; and
  performing image translation on the target dimension feature of the object to obtain object image information corresponding to the object.

In another aspect, the embodiments of this application provide an object recognition apparatus based on ultrasonic echoes, including:
  a transmission unit configured to transmit an ultrasonic signal to an object through an acoustic wave transmission apparatus of a terminal;
  a receiving unit configured to receive an echo signal reflected by the object through an acoustic wave receiving apparatus of the terminal, the echo signal corresponding to the ultrasonic signal;
  an extraction unit configured to extract an ultrasonic echo feature corresponding to the echo signal;
  a conversion unit configured to perform feature dimension conversion on the ultrasonic echo feature using a target model to obtain a target dimension feature for characterizing the object; and
  a recognition unit configured to perform image translation on the target dimension feature of the object to obtain object image information corresponding to the object.

In another aspect, an embodiment of this application provides a computer device, including: a memory, a processor, and a bus system, the memory being configured to store program code; and the processor being configured to perform the object recognition method based on ultrasonic echoes according to the foregoing aspect according to instructions in the program code.

In another aspect, an embodiment of this application provides a non-transitory computer-readable storage medium, storing instructions, the instructions, when executed by a processor of a computer device, causing the computer device to perform the object recognition method based on ultrasonic echoes according to the foregoing aspects.

In still another aspect, an embodiment of this application provides a computer program product or a computer program, the computer program product or the computer program including computer instructions, the computer instructions being stored in a non-transitory computer-readable storage medium. A processor of a computer device reads the computer instructions from the computer-readable storage medium and executes the computer instructions to cause the computer device to perform the object recognition method based on ultrasonic echoes according to the foregoing aspects.

As can be seen from the foregoing technical solution, the embodiments of this application have the following advantages.

An ultrasonic signal is transmitted to an object through an acoustic wave transmission apparatus of a terminal; then, an echo signal reflected by the object is received based on the ultrasonic signal through an acoustic wave receiving apparatus of the terminal, a target model is called to perform feature dimension conversion on the ultrasonic echo feature corresponding to the echo signal, so as to obtain a target dimension feature for characterizing the object; and image translation processing is further performed on the target dimension feature of the object, so as to obtain object image information corresponding to the object. Compared with image collection in which accurate imaging may be implemented with sufficient ambient light, the transmission of ultrasonic signals and the reception of reflected echo signals are less sensitive to the changes of scenarios. In various scenarios where image collection is applicable or not, physical information carried by ultrasonic echoes can be accurately translated into the object image information of the object, thereby ensuring the accuracy of object recognition and improving the security of the terminal.

DESCRIPTION OF EMBODIMENTS

Embodiments of this application provide an object recognition method and apparatus based on ultrasonic echoes and a storage medium, the method including: transmitting an ultrasonic signal to an object through an acoustic wave transmission apparatus of a terminal; then, receiving an echo signal reflected by the object through an acoustic wave receiving apparatus of the terminal, the echo signal corresponding to the ultrasonic signal; further, performing vector normalization processing on the echo signal to extract an ultrasonic echo feature corresponding to the echo signal; calling a target model to perform feature dimension conversion on the ultrasonic echo feature, so as to obtain a target dimension feature for characterizing the object; and further, performing face translation processing on the target dimension feature of the object, so as to obtain face image information corresponding to the object. Therefore, an object recognition process based on ultrasonic signals is realized. The echo signal based on the ultrasonic signal corresponds to the object, such that the object recognition is applicable to different scenarios, ensuring the accuracy of object recognition and improving the security of the terminal.

The terms such as "first", "second", "third", and "fourth" (if any) in the specification and claims of this application and in the accompanying drawings are used for distinguishing similar objects and not necessarily used for describing any particular order or sequence. Data used in this way is interchangeable in a suitable case, so that the embodiments of this application described herein can be implemented in a sequence in addition to the sequence shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

First, some terms occurring in the embodiments of this application are explained as follows.

Acoustic echo: acoustic waves reflected from an object after the acoustic waves are transmitted.

Face feature extractor: a network for extracting face features from a picture.

Acoustic wave conversion network: a network for extracting features from an inputted acoustic wave sample and generating face features.

Face image translation network: a network for translating high-dimensional face features to obtain a corresponding face image.

Figure 1:
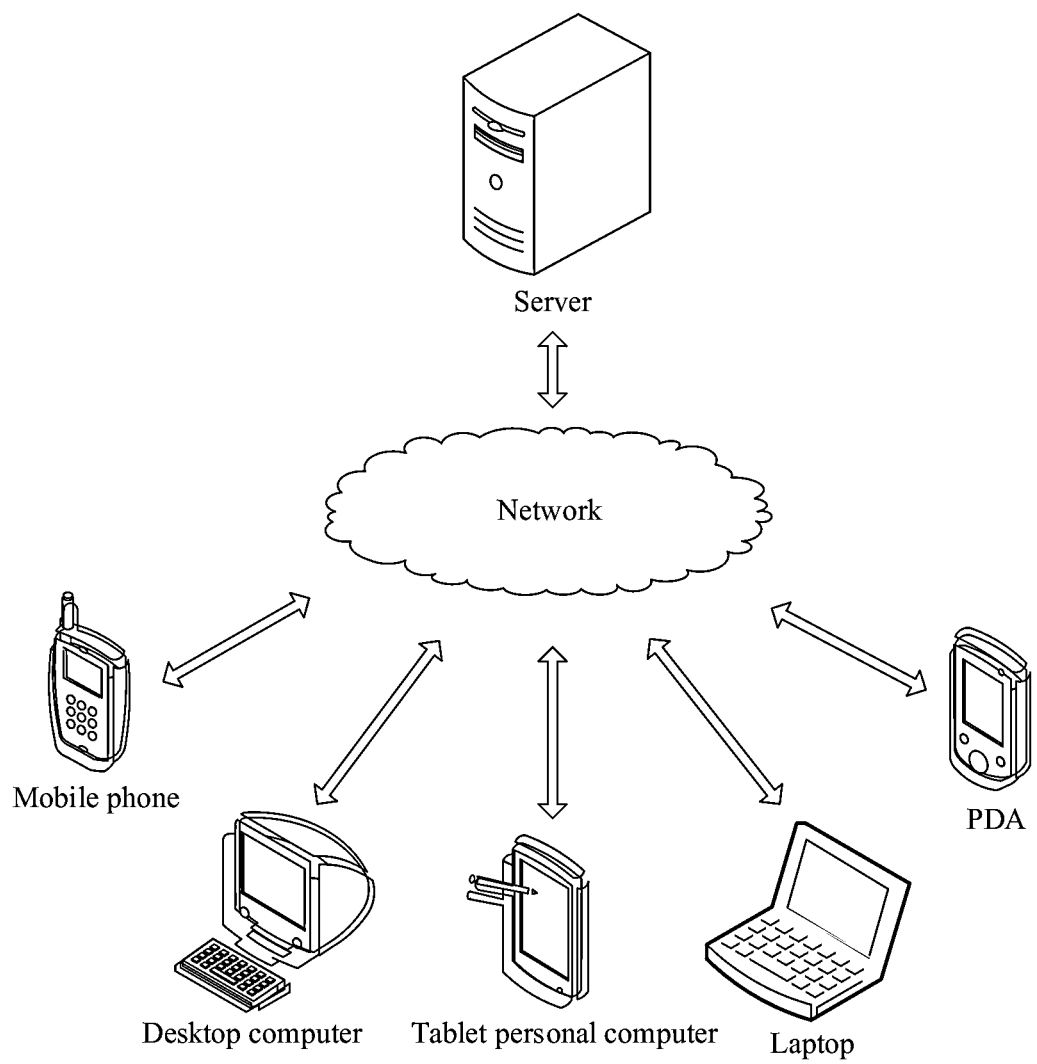
FIG. 1 is a network architecture diagram of operation of an object recognition system based on ultrasonic echoes.

It is to be understood that an object recognition method based on ultrasonic echoes provided by this application can be applied to a system or program having an object recognition function based on ultrasonic echoes in a terminal device, such as a password protection application. Specifically, the object recognition system based on ultrasonic echoes may be operated in a network architecture shown in FIG. 1. FIG. 1 shows a network architecture diagram of operation of the object recognition system based on ultrasonic echoes. It can be seen from this figure that the object recognition system based on ultrasonic echoes may provide object recognition processes based on ultrasonic echoes for multiple information sources, that is, ultrasonic echo information is collected through a terminal and an image is restored based on the ultrasonic echo information on a server side, so that a corresponding object recognition process is performed. It can be understood that FIG. 1 shows multiple terminal devices which may be mobile terminals such as mobile phones, and computer devices, etc. However, in actual scenarios, there may be more or fewer types of terminal devices participating in the object recognition process based on ultrasonic echoes, and the specific quantity and types are determined in terms of the actual scenarios, which are not limited herein. In addition, FIG. 1 shows a server, but in actual scenarios, there may be multiple servers for participating, the specific quantity of which depends on the actual scenarios.

In this embodiment, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner, and the terminal and the server may be connected to form a blockchain network. This is not limited in this embodiment of this application.

It can be understood that the above object recognition system based on ultrasonic echoes may be operated on a personal mobile terminal, for example: such an application used as the password protection application, may also be operated on the server, and may further also be operated on a third-party device to provide object recognition based on ultrasonic echoes, so as to obtain an object recognition result based on ultrasonic echoes for an information source. Specifically, the object recognition system based on ultrasonic echoes may be operated in the above device in the form of a program, may also be operated as a system component in the above device, and may further also be used as a cloud service program. The specific operation modes depend on actual scenarios and are not limited herein.

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The solutions provided in the embodiments of this application relate to computer vision (CV) technologies of artificial intelligence (AI). The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technology generally includes technologies such as image processing, image restoration, image recognition, image semantic understanding, image retrieval, optical character recognition (OCR), video processing, video semantic understanding, video content/behavior recognition, three-dimensional object reconstruction, a 3-dimension (3D) technology, virtual reality (VR), augmented reality (AR), synchronous positioning, and map construction, and further include biological feature recognition technologies such as common face recognition and object recognition.

With the development of artificial intelligence technologies, object recognition has been widely applied to the fields such as security and finance. During the object recognition, using objects are recognized, such that the accuracy of permission management for application scenarios and the safety performance of terminals are improved.

In related technologies, the object recognition is performed based on image recognition, that is, features of images are extracted by collecting image information of using objects or objects to be recognized, so as to take obtained results as recognition results of the objects.

However, during the image recognition performed on a terminal, image features may not be capable of covering all complex scenarios due to the diversity of scenarios, that is, a recognition process based on image features may be affected by the changes of scenarios, thereby causing errors of object recognition and affecting the accuracy of object recognition and the security of a corresponding terminal.

Figure 2:
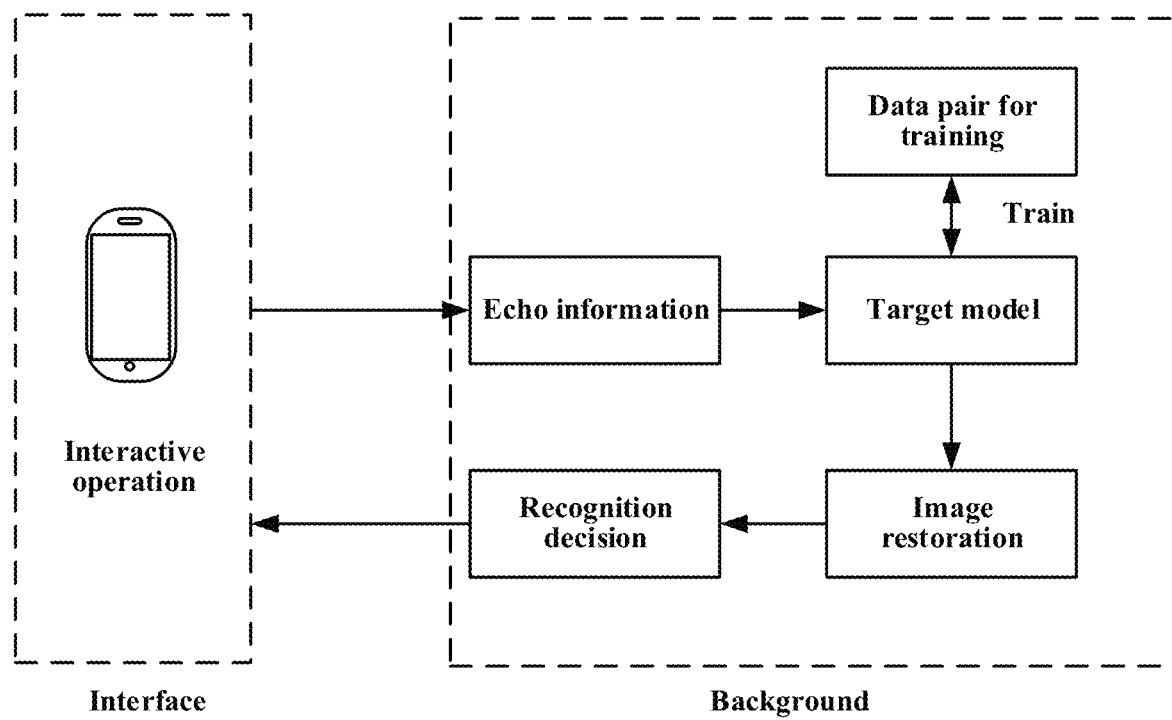
FIG. 2 is a process architecture diagram of object recognition based on ultrasonic echoes according to an embodiment of this application.

To address the above problems, this application provides an object recognition method based on ultrasonic echoes, which is applied to a process framework of object recognition based on ultrasonic echoes, as shown in FIG. 2. FIG. 2 shows a process architecture diagram of object recognition based on ultrasonic echoes according to an embodiment of this application, in which a user performs relative private operations through an interface layer. To ensure that the private operation is performed by the user himself/herself, an object recognition process may be triggered in the background, that is, the terminal controls an acoustic wave transmission apparatus (such as a loudspeaker) to transmit an ultrasonic signal to an object, and an acoustic wave receiving apparatus (such as a microphone) receives an ultrasonic signal reflected by the object, i.e., an echo signal. Then, the collected echo signal is inputted into a target model for recognition. The target model is obtained by performing comparison training on echo information related to the user and image information and already has a capability of restoring the echo information into the image information, such that a recognition process for the echo signal is ensured, and furthermore, the image information corresponding to the echo signal is outputted.

In a possible scenario, the terminal is a mobile phone, that is, it may transmit single-channel ultrasonic waves to an object by controlling a loudspeaker at the position where a front-facing camera is mounted, then receive the single-channel ultrasonic waves reflected by the object through a microphone, and record a face video of the user or collect a face image of the user through the front-facing camera. Specifically, this video may be a 2D face image sequence of the user. Further, the terminal may transmit the above acoustic waves and image information to a server for feature extraction, that is, firstly, a detected single ultrasonic echo vector is normalized and a high-dimensional feature obtained from a 2D face image through a face feature extractor is used as a target feature; and then, the ultrasonic echo vector passes through the acoustic wave conversion network to train the network to approach to a corresponding face feature and restore a 2D image by using the face feature obtained from the acoustic waves. Finally, the acoustic wave conversion network may be capable of learning a mapping relationship between reflected acoustic waves and face image features to construct a face image from the reflected acoustic waves, thus recognizing the echo information collected by the terminal to obtain a recognized image.

It can be understood that, in the embodiments of this application, physical information contained in the ultrasonic echoes may be extracted by learning a mapping relationship between the ultrasonic echoes and high-dimensional features of the 2D face image. The extracted image features may be used as the basis for further learning other tasks (such as identity verification) based on ultrasounds.

It can be understood that the method provided by this application may be the writing of a program, which can be used as a processing logic in a hardware system and can also be used as an object recognition apparatus based on ultrasonic echoes. The above processing logic may be implemented in an integrated or add-in mode. As an implementation, the object recognition apparatus based on ultrasonic echoes transmits an ultrasonic signal to an object through an acoustic wave transmission apparatus of a terminal; then receives an echo signal reflected by the object through an acoustic wave receiving apparatus of the terminal and calls a target model to perform feature dimension conversion on the ultrasonic echo feature corresponding to the echo signal, so as to obtain a target dimension feature for characterizing the object; and further performs image translation on the target dimension feature of the object, so as to obtain object image information corresponding to the object. Compared with image collection in which accurate imaging may be implemented with sufficient ambient light, the transmission of ultrasonic signals and the reception of reflected echo signals are less sensitive to the changes of scenarios. In various scenarios where image collection is applicable or not, physical information carried by ultrasonic echoes can be accurately translated into the object image information of the object, thereby ensuring the accuracy of object recognition and improving the security of the terminal.

Figure 3:
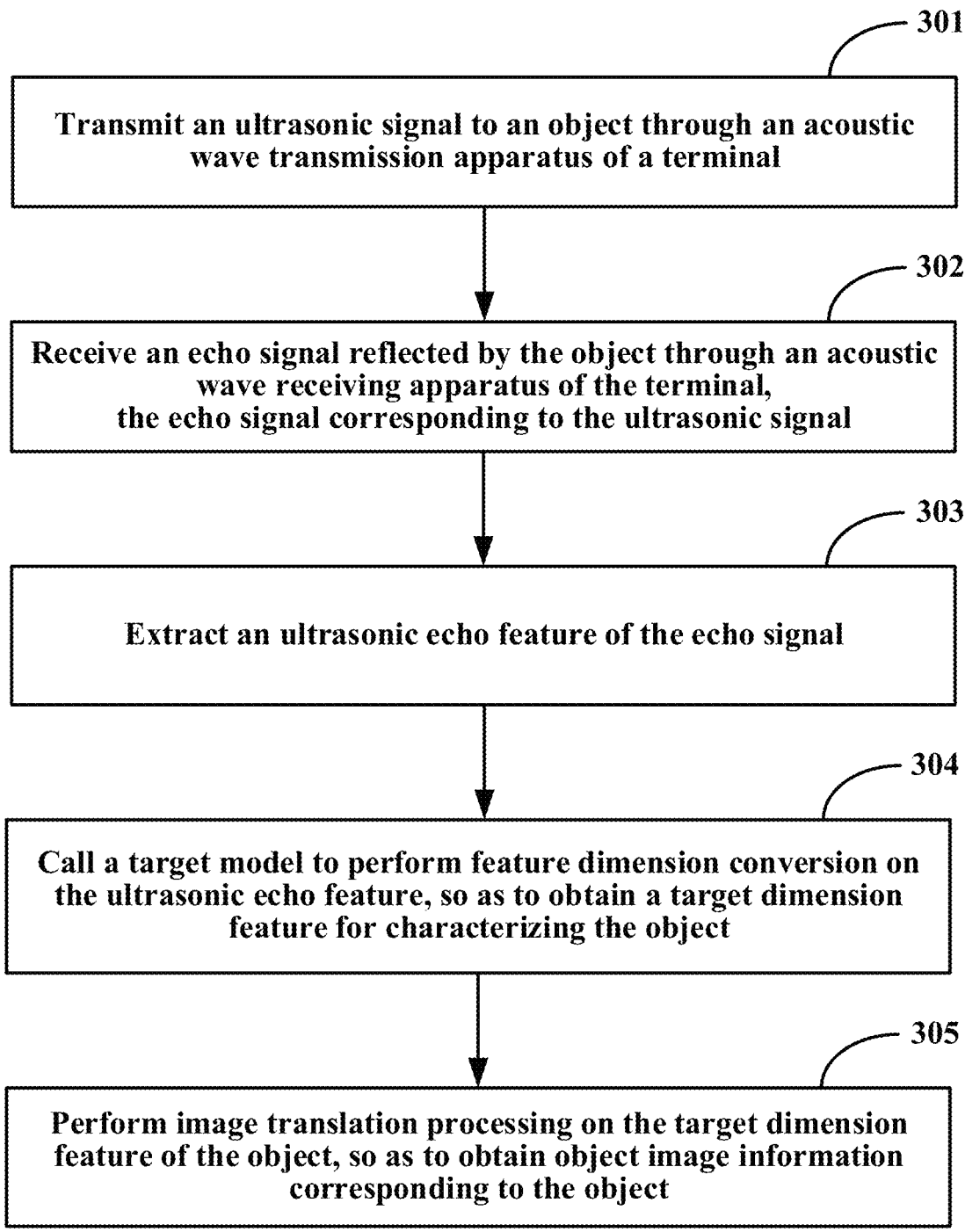
FIG. 3 is a flowchart of an object recognition method based on ultrasonic echoes according to an embodiment of this application.

The solutions provided in the embodiments of this application relate to technologies such as CV of AI, and are specifically described by using the following embodiments:

The object recognition method based on ultrasonic echoes in this application will be described below in conjunction with the process architecture above. Referring to FIG. 3, FIG. 3 is a flowchart of the object recognition method based on ultrasonic echoes according to an embodiment of this application, and the management method may be performed by a computer device. The computer device may include a terminal device, may also include a server, and may also include a terminal device and a server. This embodiment of this application may include at least the following steps:

301. Transmit an ultrasonic signal to an object through an acoustic wave transmission apparatus of a terminal.

In this embodiment, there may be a need of hardware for supporting when the terminal transmits ultrasonic waves. For example, when the terminal is a mobile phone, hardware devices used include a loudspeaker and a microphone, and an auxiliary device is a front-facing camera that is configured in each smart phone at present. Taking this embodiment as an example, the loudspeaker at the top of the mobile phone is used as the acoustic wave transmission apparatus, the microphone is used as the acoustic wave receiving apparatus, and the front-facing camera is used as the image collection apparatus for collecting images and videos.

Figure 4:
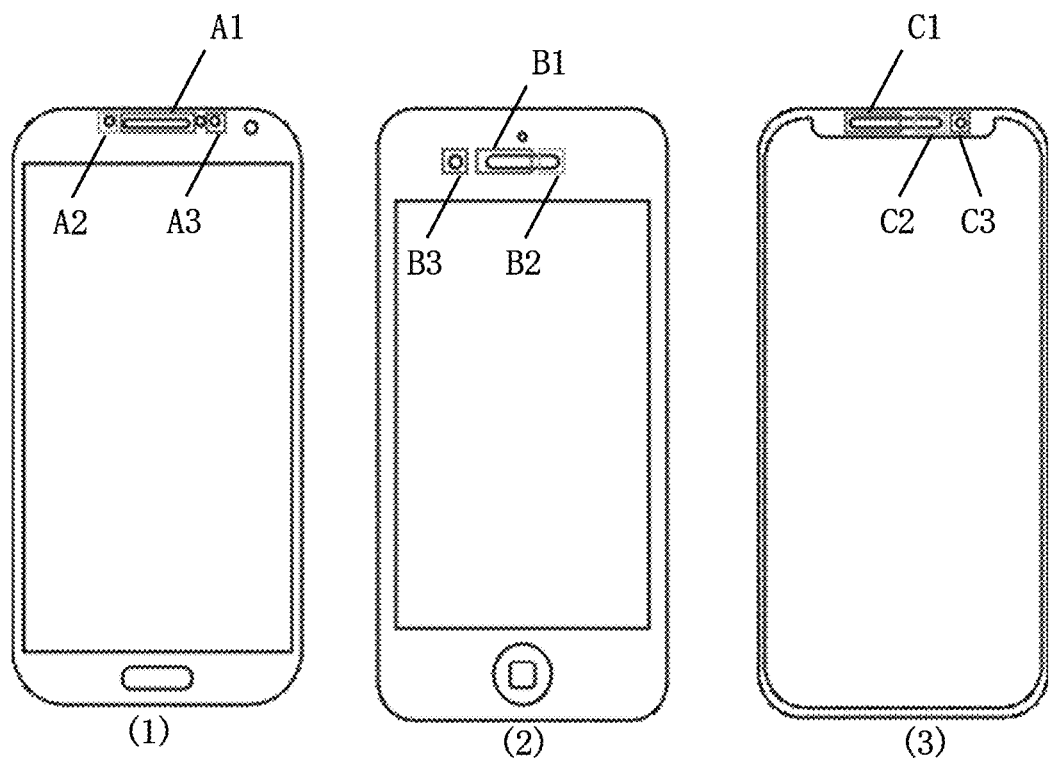
FIG. 4 is the first schematic scenario diagram of an object recognition method based on ultrasonic echoes according to an embodiment of this application.

In a possible scenario, FIG. 4 shows the first schematic scenario diagram of an object recognition method based on ultrasonic echoes according to an embodiment of this application. In FIG. 4, Pictures (1), (2) and (3) represent mobile terminals with different configurations, where Picture (1) in FIG. 4 shows a loudspeaker A1, a microphone A2, and a front-facing camera A3; Picture (2) in FIG. 4 shows a loudspeaker B1, a microphone B2, and a front-facing camera B3; and Picture (3) in FIG. 4 shows a loudspeaker C1, a microphone C2, and a front-facing camera C3. Specifically, the loudspeaker is configured to transmit ultrasonic signals; the microphone is configured to receive echo signals of the ultrasonic signals; and the front-facing camera is configured to shoot images and recording videos.

It can be understood that FIG. 4 shows the locations of sensors on three types of mobile phones (such as Android phones, iPhone series and special-shaped screen phones). The locations of the three sensors on smart phones with other structures are determined depending on actual scenarios, and are not limited herein.

In some embodiments, in this embodiment, the ultrasonic signal transmitted by the loudspeaker may be a multi-channel ultrasonic signal. For the sake of the applicability of a mobile terminal, an object recognition process may be implemented only by a single-channel ultrasonic signal, thereby remarkably reducing the cost and improving the technical applicability.

Specifically, while meeting obstacles or planes during propagation, single-channel ultrasonic waves will generate reflection and diffuse reflection. An echo signal generated contains not only distance information, but also shape and material information of reflecting surfaces or obstacles themselves.

302. Receive an echo signal reflected by the object through an acoustic wave receiving apparatus of the terminal, the echo signal corresponding to the ultrasonic signal.

In this embodiment, the echo signal is an acoustic signal obtained by reflecting the ultrasonic signal through the object. In a possible implementation, the acoustic wave receiving apparatus may be the microphone in step 301, reference can be made on related descriptions and details are not described herein.

Figure 5:
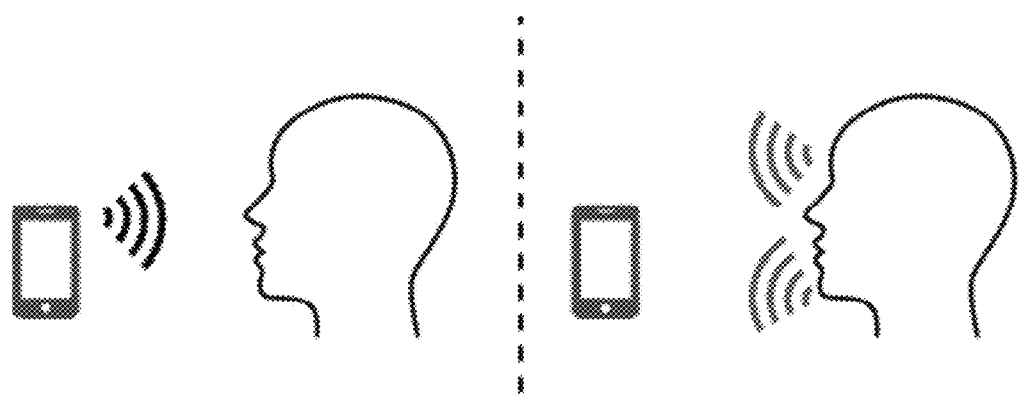
FIG. 5 is the second schematic scenario diagram of an object recognition method based on ultrasonic echoes according to an embodiment of this application.

In some embodiments, the acoustic wave receiving apparatus in this embodiment may also be configured to acquire echo training data. The target model is trained by using the echo training data acquired by the acoustic wave receiving apparatus. FIG. 5 shows the second schematic scenario diagram of an object recognition method based on ultrasonic echoes according to an embodiment of this application. A mobile phone may be placed toward a face used as a sample object, such that the frontal face appears in the central position of a front-facing camera and a top loudspeaker of the mobile phone transmits ultrasonic waves (acoustic waves with a high frequency, which are difficult to receive by human ears), as shown in the left picture in FIG. 5. When the acoustic waves meet obstacles during the propagation in the air, they will generate echoes. While propagating to the face, the acoustic waves meet the obstacles and form reflections, as shown in the right picture in FIG. 5. The acoustic waves form reflections on different planes of the face and the reflected echoes propagate to the mobile phone and are received by the top microphone. During ultrasonic wave transmission and echo reception, the front-facing camera records to collect image training data of corresponding moments.

In some embodiments, it is put forward in this embodiment that the top microphone and loudspeaker of the mobile phone are used to be fitted with the front-facing camera. The solution is not limited to this, and any loudspeaker and any microphone of the same mobile device may be used together to perform ultrasonic wave transmission or echo collection. Specific locations of hardware depend on actual scenarios and are not limited herein.

In addition, this embodiment considers cost control and expandability based on single-channel acoustic wave transmission and recovery. Usually, a multi-channel array can provide more abundant information, which may be represented on a mobile terminal as simultaneously using multiple loudspeakers and microphones to transmit acoustic waves and receive echoes or adding external devices. The changes of the quantity of devices used and locations of the acoustic wave transmission apparatus and the acoustic wave receiving apparatus are regarded as the extension of this embodiment.

Based on the description of the above embodiment, echo training data and image training data can be acquired through the terminal. A specific data scale may be determined for multiple sample objects (such as face recognition for 100 people), may also be determined for multiple sample objects in a certain group (such as face recognition for males), and further may also be determined for a reinforced recognition process of specific users used as sample objects (for example, face data of a user is acquired during the initialization of a mobile phone to adjust parameters of a target model in the mobile phone, such that the target model may more accurately perform face recognition for this user). The specific scale of training data and application mode depend on actual scenarios, and are not limited herein.

303. Extract an ultrasonic echo feature corresponding to the echo signal.

In this embodiment, a vector normalization processing method may be used for extracting the ultrasonic echo feature. Such vector normalization processing may include the steps of generating frequency spectrum information corresponding to the echo signal, such as a spectrogram, processing same to obtain frequency-domain and time-domain information, and extracting features in the frequency-domain and time-domain information to obtain the ultrasonic echo feature corresponding to the echo signal.

It can be understood that when an object is a user, the distance between the user and the terminal is limited and a corresponding transmission distance of ultrasonic waves is also limited, so that the time-domain information in a specified time range may be captured in the process of extracting the ultrasonic echo feature of the echo signal. This avoids recognition interference caused by the fact that the information corresponds to echo signals of other objects, thereby improving the accuracy of feature extraction.

304. Perform feature dimension conversion on the ultrasonic echo feature, e.g., by calling a target model so as to obtain a target dimension feature for characterizing the object.

In this embodiment, target models are models that convert echo information into image information, where target models with parameters that are not adjusted may also be called preset models. The process for training a preset model to obtain a target model will be described below. This preset model includes an image feature extraction network and an acoustic wave conversion network, where the former is used for extracting an image training feature corresponding to the image training data and the latter is used for extracting an acoustic wave training feature corresponding to the echo training data. A parameter adjustment process is a process for training the preset model to obtain the target model. In the embodiments of this application, the process mainly adjusts parameters of the acoustic wave conversion network, such that the acoustic wave training feature output by the acoustic wave conversion network after training can match with the image training feature. In addition, a training process for the acoustic wave conversion network is performed according to the similarity loss obtained by comparing the image training feature and the acoustic wave training feature, that is, the training is intended to minimize the difference between the acoustic wave training feature and the image training feature.

Specifically, a training process for the preset model, that is, a matching process for the acoustic wave training feature and the image training feature, refers to the matching of multiple feature vector dimensions. To ensure the accuracy of matching, the acoustic wave training feature and the image training feature may be represented by using high dimensions (such as 2048 dimensions). Firstly, the image training data may be inputted into the image feature extraction network in the preset model to determine an image training feature in response to a target dimension (such as the above 2048 dimensions). Then, a corresponding echo training feature is generated based on the echo training data (for example, a spectrogram is generated and processed to obtain frequency-domain and time-domain information). Next, the echo training feature is inputted into the acoustic wave conversion network in the preset model to process the echo training feature into an acoustic wave training feature having the same dimension as the image training feature based on the target dimension (such as the above 2048 dimensions). The image training feature is used as a training target to adjust the acoustic wave training feature, so as to obtain the similarity loss based on the image training feature and the acoustic wave training feature. Parameters of the acoustic wave conversion network in the preset model are adjusted based on the similarity loss, so as to obtain the target model. After the parameters of the acoustic wave conversion network are adjusted, the accuracy of the matching process for the acoustic wave training feature and the image training feature is ensured, that is, the accuracy of the similarity loss is improved and the capability of the target model to convert an acoustic wave feature into an image feature is ensured.

In some embodiments, embodiments of this application mainly need the capability of the target model to convert the acoustic wave feature into the image feature, so that parameters of the image feature extraction network in the preset model may be set to fixed ones during the training of the preset model. Further, in response to setting fixed parameters of the image feature extraction network in the preset model, parameters of the acoustic wave conversion network in the preset model are adjusted based on the similarity loss, so as to obtain the target model. Therefore, unnecessary influences on the image feature extraction network, which are generated by the training process based on the similarity loss, are avoided.

In some embodiments, a process for converting the acoustic wave feature into the image feature involves an image translation network, that is, the preset model further includes the image translation network. On the basis of the above same reasoning, parameters of the image translation network may also be set to fixed ones during the training process based on the similarity loss.

Specifically, a training process for the image feature extraction network and the image translation network may be directly used after pre-training with additional data sets. For example, firstly, pre-training data is acquired, which is used for indicating a correspondence between a pre-training image and a pre-training feature; and then, the image feature extraction network in the preset model is trained based on the pre-training data to adjust the parameters of the image feature extraction network in the preset model.

It can be understood that in order to ensure the privacy of subsequent recognition data, data samples used for training and data used for subsequent tests are different, and trainings and test sets are ensured to be not overlapped, thus avoiding the information disclosure of the object.

Figure 6:
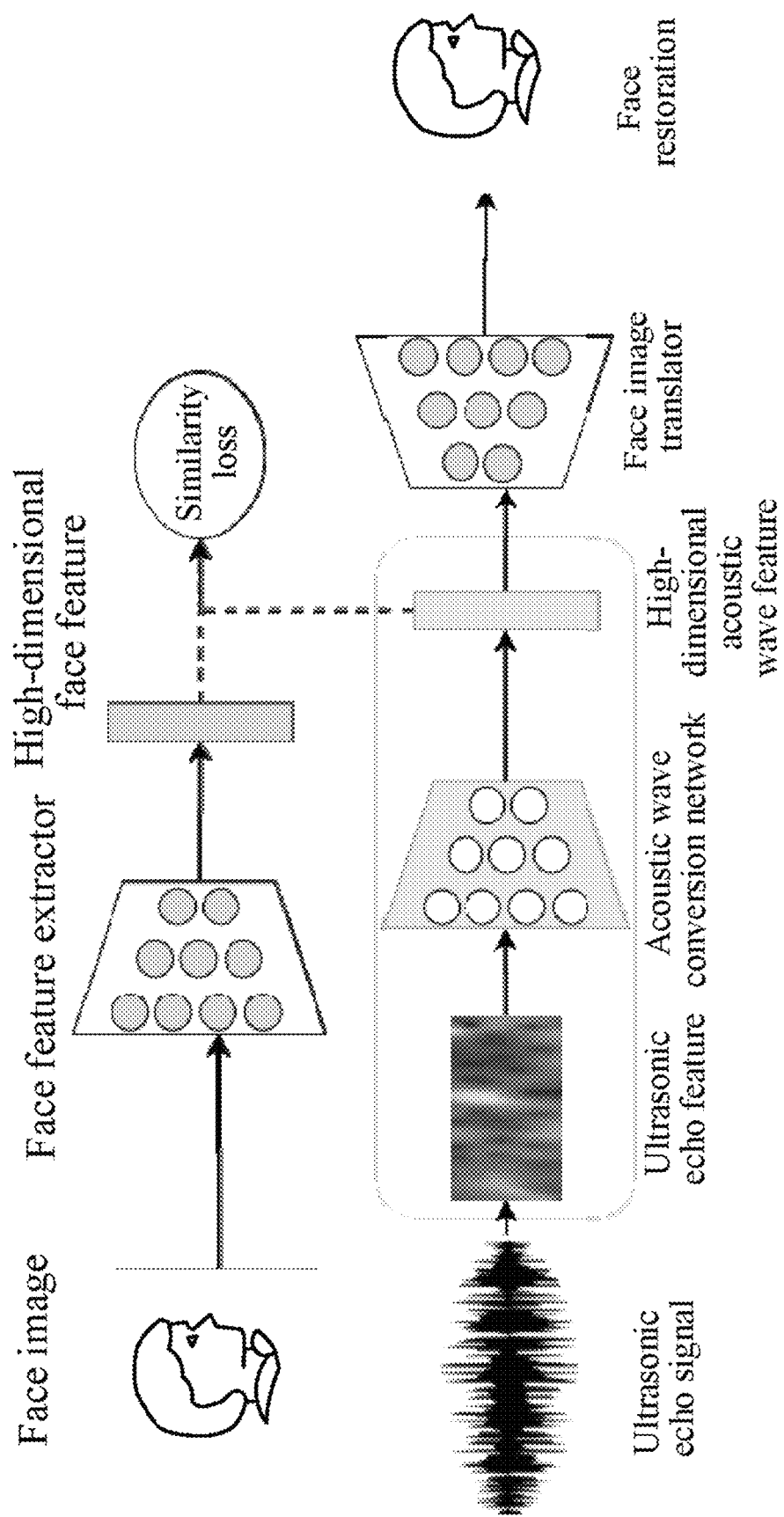
FIG. 6 is the third schematic scenario diagram of an object recognition method based on ultrasonic echoes according to an embodiment of this application.

In a possible scenario, the image training data in this application is face image data, and reference may be made on the scenario framework shown in FIG. 6 for corresponding target model (or preset model). FIG. 6 shows the third schematic scenario diagram of an object recognition method based on ultrasonic echoes according to an embodiment of this application. The face feature extractor (image feature extraction network), the acoustic wave conversion network and a face image translator (image translation network) are shown in this figure. Specifically, a model training process includes: firstly, using the pre-trained face feature extractor to perform feature processing on a face image, so as to obtain a high-dimensional face feature used as a training target; at the same time, processing an ultrasonic echo signal (for example, generating a spectrogram, etc.) and processing same to obtain frequency-domain and time-domain information (such as an ultrasonic echo feature shown in FIG. 6); inputting the information into the acoustic wave conversion network and convert same into a high-dimensional acoustic wave feature; comparing the high-dimensional acoustic wave feature with the above processed high-dimensional face feature to minimize the difference therebetween; and then, inputting the extracted high-dimensional acoustic wave feature into the face image translator to obtain a restored face.

Specifically, a model training process includes: processing an inputted 2D face image into a high-dimensional face feature (for example a 2048-dimensional vector) through the face feature extractor, and processing the echo signal into a high-dimensional acoustic wave feature having the same dimension with the high-dimensional face feature through the acoustic wave conversion network; and calculating the difference between two variables (high-dimensional face feature and high-dimensional acoustic wave feature) through the similarity loss and updating the acoustic wave conversion network through back-propagation.

It can be understood that the face feature extractor and the face image translator are directly used after pre-training with additional data sets, and parameters remain fixed in the model training process. Data samples used for training and data used for tests are different, and trainings and test sets are ensured to be not overlapped, thus avoiding the occurrence of information disclosure.

In a possible scenario, after the target model is trained, an object recognition process based on single-channel ultrasonic waves, such as face recognition, may be performed. Specific recognition objects may be objects related to humans (or animals), such as faces and whole bodies, and may also be objects related to things, such as flowers and trees. The specific objects depend on actual scenarios.

It can be understood that the object recognition process needs to correspond to training data used in the training process, that is, if object recognition is performed for a face, the training data includes echo training data and image training data based on the face.

Figure 7:
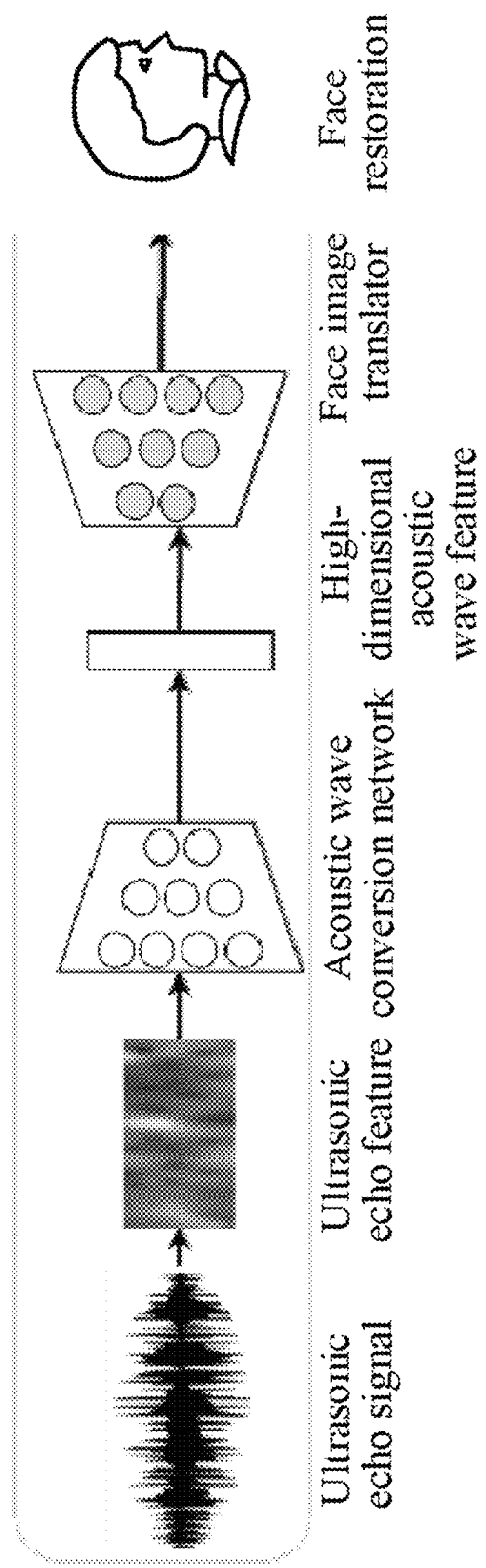
FIG. 7 is the fourth schematic scenario diagram of an object recognition method based on ultrasonic echoes according to an embodiment of this application.

In another possible scenario, a recognition process for the echo signal (ultrasonic echo signal) is shown in FIG. 7, which shows the fourth schematic scenario diagram of an object recognition method based on ultrasonic echoes according to an embodiment of this application. That is, after a newly collected ultrasonic echo signal is processed (extraction of echo features, such as frequency and intensity threshold), an obtained ultrasonic echo feature is inputted into the acoustic wave conversion network to obtain a high-dimensional acoustic wave feature; and then, the high-dimensional acoustic wave feature is inputted into the face image translator, so as to directly generate an image (such as a restored face image) from the ultrasonic echo signal.

305. Perform image translation on the target dimension feature of the object, so as to obtain object image information corresponding to the object.

In this embodiment, the model that has been trained a lot already has the capability to restore a corresponding image of the object from an echo signal of the object. As a result, the target model may restore a clean face clearly, and a restored image is extremely similar to an actually collected one, with a small difference in physical locations. It can be proved that the single-channel ultrasonic echoes have the capability to restore corresponding images.

It can be understood that in this embodiment, in addition to verifying that the target model has the capabilities to extract physical information from the echo signal and generate an object image, a restored object image or intermediate layer feature may also directly serve other task scenarios. For example, a face image restored by acoustic waves can be directly inputted into a classical face recognition network for recognition, and may also be compared with a face shot by the camera to observe whether they are the same. At the same time, if a user tries to deceive the object recognition by using a photo or a face image on a screen, a restored face image and a shot image may be quite different because reflected ultrasonic waves contain abundant physical location and depth-of-field information, so that an invalid object recognition scenario can be detected.

In some embodiments, in this embodiment, finally generated object image information may be a red, green and blue (RGB) triple-channel color graph. In principle, an ultrasonic echo signal does not contain color information, and image colors learned by the target model may be regarded as priori knowledge learned based on training data. In some scenarios, the object image information may also be a gray-scale image, so that color selection for the object image information may also be regarded as an exemplary parameter of this embodiment.

In a possible scenario, the target model in this application may be applied to identity verification, e-commerce, data security, financial risk control, intelligent hardware, etc., for example, as an identity verification model for e-commerce, or as a transaction object recognition model in financial risk control. The specific model usage depends on actual scenarios, and is not limited herein.

It can be seen from the embodiment that an ultrasonic signal is transmitted to an object through an acoustic wave transmission apparatus of a terminal; then an echo signal reflected by the object is received based on the ultrasonic signal through an acoustic wave receiving apparatus of the terminal, and a target model is called to perform feature dimension conversion on the ultrasonic echo feature corresponding to the echo signal, so as to obtain a target dimension feature for characterizing the object; and image translation processing is further performed on the target dimension feature of the object, so as to obtain object image information corresponding to the object. Compared with image collection in which accurate imaging may be implemented with sufficient ambient light, the transmission of ultrasonic signals and the reception of reflected echo signals are less sensitive to the changes of scenarios. In various scenarios where image collection is applicable or not, physical information carried by ultrasonic echoes can be accurately translated into the object image information of the object, thereby ensuring the accuracy of object recognition and improving the security of the terminal.

Figure 8:
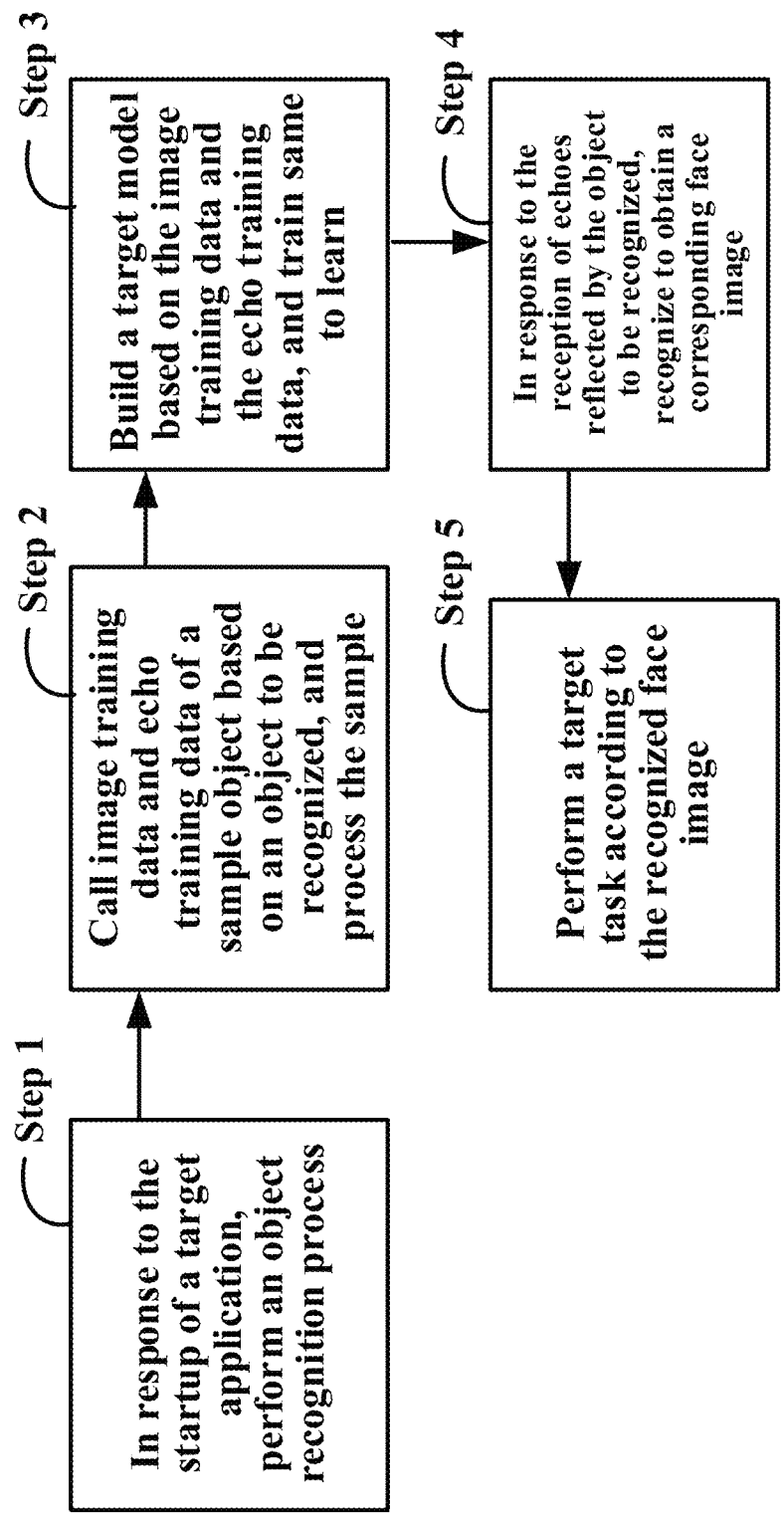
FIG. 8 is a flowchart of one object recognition method based on ultrasonic echoes according to an embodiment of this application.

The above embodiment introduces the training and usage process of the target model, where the training of the target model uses echo training data and image training data. However, in some scenarios, the echo training data and the image training data may be trained as samples. The scenario will be introduced below. FIG. 8 shows the fifth schematic scenario diagram of an object recognition method based on ultrasonic echoes according to an embodiment of this application. The scenario includes the following steps:

Step 1. In response to the startup of a target application, perform an object recognition process.

In this embodiment, the object recognition method based on ultrasonic echoes may be started by triggering in a software application dimension, that is, an object recognition process is triggered in response to the startup of the target application. For example, the object recognition process is triggered in response to the downloading of a password protection application, or the object recognition process is triggered for a configuration process of the password protection application.

In addition, the object recognition method based on ultrasonic echoes may also be started by triggering in a hardware device dimension. For example, the object recognition process is triggered during the initialization of a mobile phone or after the change of an SIM card of the mobile phone is detected.

Step 2. Call image training data and echo training data of a sample object based on an object, and process the sample.

In this embodiment, data collection and processing for the image training data (image signals) and the echo training data (acoustic signals) are performed in order to generate a sample pair for training a preset model. The preset model is an untrained target model. Specifically, the step includes: controlling an acoustic wave transmission apparatus in a terminal to transmit single-channel ultrasonic waves to the sample object based on a preset frequency feature; then, receiving reflected acoustic wave data based on the acoustic wave receiving apparatus in the terminal to determine the echo training data; in response to receiving the echo training data, calling an image collection apparatus in the terminal to collect image training data corresponding to the sample object; aligning the echo training data with the image training data based on execution time to generate a training sample pair; and further, training the preset model based on the training sample pair to obtain a target model.

It can be understood that the single-channel ultrasonic waves are transmitted based on the preset frequency feature to facilitate the filtering of acoustic signals. This is because a microphone (acoustic wave receiving apparatus) may either collect echoes reflected by a face or directly receive ultrasonic waves transmitted by a loudspeaker (acoustic wave transmission apparatus). However, the ultrasonic waves transmitted by the loudspeaker will be attenuated during the echo reflection process, but not the directly received ultrasonic waves that are transmitted by the loudspeaker. Therefore, the acoustic signals may be filtered according to the preset frequency feature, ensuring the accuracy of signals.

Specifically, a screening process includes: firstly, receiving reflected undetermined acoustic wave data based on the acoustic wave receiving apparatus in the terminal; then, filtering the undetermined acoustic wave data according to the preset frequency feature to determine the acoustic wave data reflected by the sample object from the undetermined acoustic wave data; and determining the echo training data based on acoustic wave data reflected by the object.

In addition, the specific acoustic wave filtering process may be performed based on a filter, including: firstly, dividing the undetermined acoustic wave data into a plurality of fixed-length acoustic sequences according to the preset frequency feature; then, filtering the acoustic sequences based on a preset filter to obtain filtered sequences; and further, performing normalization processing on the filtered sequences according to a sliding window to determine the acoustic wave data reflected by the sample object. The sequences are normalized, such that the continuity of the acoustic wave data is ensured.

It can be understood that an image may be acquired by video collection, so that an image data processing process may include: in response to receiving the echo training data, calling the image collection apparatus in the terminal to collect video streaming corresponding to the sample object; then, acquiring a time stamp corresponding to each video frame in the video streaming; and further, aligning the echo training data with the image training data according to the time stamp to generate a training sample pair, thus ensuring the correspondence between the acoustic wave data and the image data.

Step 3. Build a target model based on the image training data and the echo training data, and train same to learn.

In this embodiment, reference is made on the scenario framework shown in FIG. 6 for model building, and details are not described herein. However, a training and learning process is to input a sample pair <image, reflected acoustic waves> into the preset model, where the image (image training data) in the sample pair is inputted into the image feature extraction network and the reflected acoustic waves (echo training data) are inputted into the acoustic wave conversion network, thus inputting a plurality of sample pairs to train the preset model and obtain the target model.

The echo training data and the image training data are inputted into the preset model in the form of sample pairs for training, ensuring the correspondence between the training data, improving the accuracy of similarity difference and ensuring the effectiveness of target model training.

Step 4. In response to the reception of echoes reflected by the object, recognize to obtain a corresponding face image.

In this embodiment, the echoes may be received after ultrasonic wave transmission is automatically triggered when private operations are initiated. The specific private operations may be scenarios corresponding to identity verification, e-commerce, data security, financial risk control, intelligent hardware verification, etc.

Step 5. Perform a target task according to the recognized face image.

In this embodiment, the target task may be an image recognition task, that is, a face image restored by acoustic waves can be directly inputted into a classical face recognition network for recognition, and may also be compared with a face shot by the camera to observe whether they are the same. At the same time, if a user tries to deceive the object recognition by using a photo or a face image on a screen, a restored face image and a shot image may be quite different because an echo signal contains abundant physical location and depth-of-field information, so that an invalid object recognition scenario can be detected.

In a possible scenario, during the initialization of an application with high security requirements in a mobile phone (such as a payment application and a privacy application), the training process for the target model in steps 1-3 above may be performed. As a result, a user object can be automatically recognized each time the application is started, and a recognized image is compared with a preset user image. If the similarity of the two images reaches a preset value (for example, the similarity is 95%), the object using the application is a preset user, thus ensuring the security of application data.

It can be seen from the above embodiment that this embodiment of this application uses the echo signal reflected from a face. The signal contains more accurate and abundant physical information which is enough to support the restoration for details of the face image. In this embodiment of this application, imaging may be performed only through single-channel acoustic echoes, such that single-channel echoes on a common mobile phone may also be imaged, the cost is significantly reduced, and the technical applicability is improved. In addition, ultrasonic echoes from the face are used for imaging, which contain more abundant and accurate physical information. With the aid of the existing mature face feature extractor, properties of a neural network may be used for flexible modeling of complex scenarios and high-precision imaging.

Figure 9:
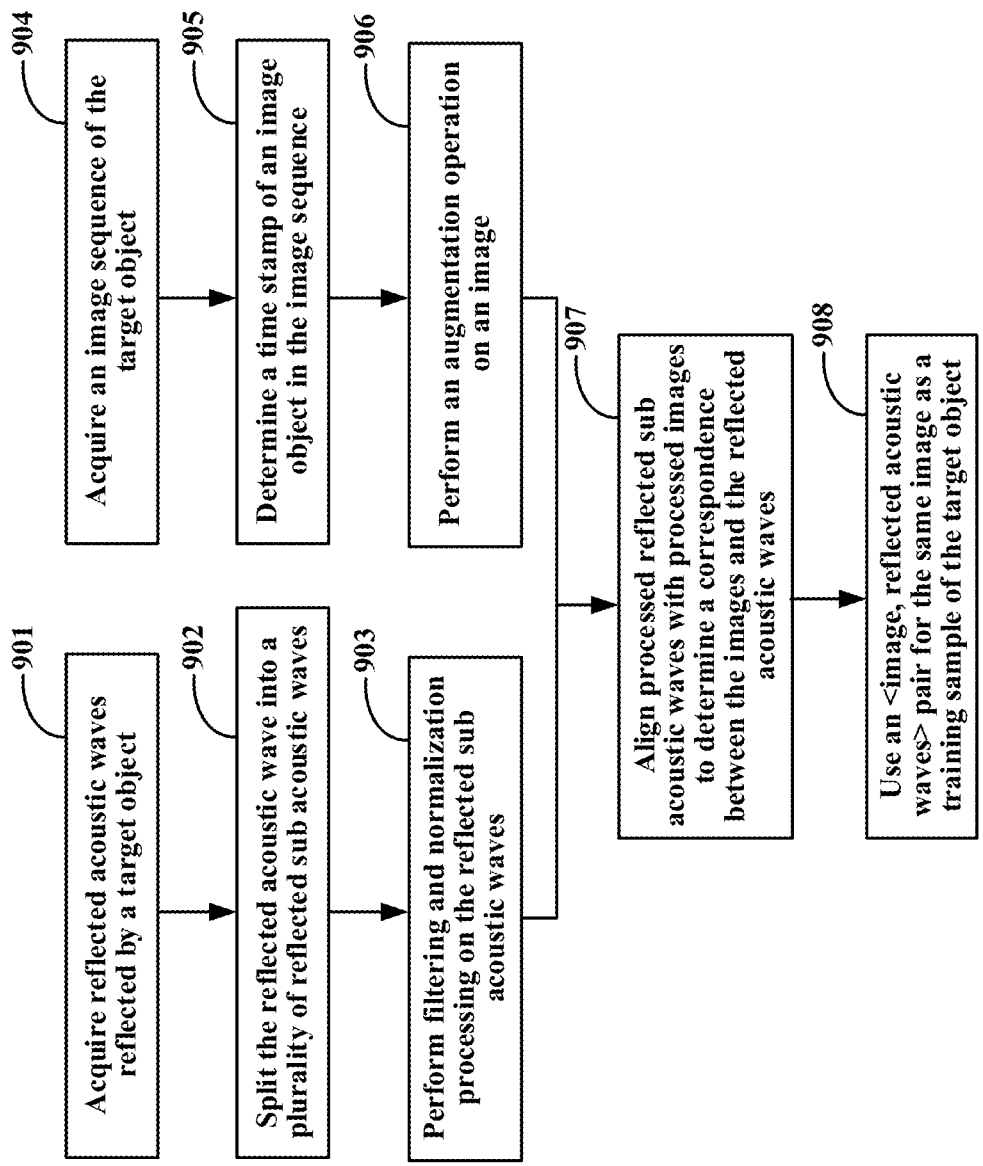
FIG. 9 is a flowchart of another object recognition method based on ultrasonic echoes according to an embodiment of this application.

In a possible scenario, a generation process of the sample pair <image, reflected acoustic waves> may use a process shown in FIG. 9. FIG. 9 shows a flowchart of another object recognition method based on ultrasonic echoes according to an embodiment of this application. This embodiment of this application includes at least the following steps:

901. Acquire reflected acoustic waves reflected by an object.

An image sequence of a target object here and a reflected acoustic wave sequence reflected by the target object are both from the target object. The image sequence includes a plurality of images, each of which corresponds to one time stamp. In a possible implementation, a terminal acquires the image sequence of any target object as follows: the terminal acquires at least one image of the any target object at a fixed time interval and sequentially sorts the at least one image according to the sequence of collection time, so as to obtain the image sequence of the any target object. In this embodiment of this application, the fixed time interval is not limited, but can be determined according to an image collection frame rate of the image collection apparatus in the terminal. For example, assuming that the image collection frame rate of the image collection apparatus is 50 frames per second (fps), the fixed time interval is 20 milliseconds (ms).

In a possible implementation, the terminal acquires acoustic waves reflected by any target object as follows: the terminal periodically transmits acoustic waves to the any target object, and takes the received reflected acoustic waves as reflected sound waves reflected by the any target object. The terminal periodically transmits the acoustic waves, so that the received reflected acoustic waves include reflected acoustic waves (by the any target object) of the acoustic waves which are transmitted within each period. In a possible implementation, the terminal periodically transmits acoustic waves to the any target object, which means that the terminal transmits acoustic waves to the any target object every once in a while. In this embodiment of this application, an interval duration between two times of acoustic wave transmission is not limited, and may be set according to a reference distance between an object to be detected which needs to be subjected to object recognition and an object recognition terminal, and an acoustic wave propagation speed. For example, the interval duration between two times of acoustic wave transmission may be set to 5 ms. The reference distance between the object to be detected which needs to be subjected to the object recognition and the object recognition terminal may be obtained according to experiences.

902. Split the reflected acoustic wave into a plurality of reflected sub acoustic waves.

The reflected acoustic wave reflected by any target object includes a reflected acoustic wave (by the any target object) of an acoustic wave that is transmitted object within each period, so that the reflected acoustic wave may be split according to a distinguishing feature into at least one reflected sub acoustic wave. Each reflected sub acoustic wave is regarded as the reflected acoustic wave (by the any target object) of the acoustic wave that is transmitted within each period. In a possible implementation, when the interval duration between two times of acoustic wave transmission is set according to the reference distance between the object to be detected which needs to be subjected to the object recognition and the object recognition terminal, and the acoustic wave propagation speed, the distinguishing feature may be a period duration. The transmitted acoustic wave itself has a transmission duration and the period duration is the sum of one transmission duration and one interval duration. For example, assuming that one transmission duration is 1 ms and one interval duration is 5 ms, the period duration is 6 ms. After the reflected acoustic wave is split according to the period duration of 6 ms, each obtained reflected sub acoustic wave is a high-frequency acoustic wave fragment of 6 ms. After the reflected acoustic wave is split into at least one reflected sub acoustic wave, each reflected sub acoustic wave corresponds to time information. Such time information may refer to a starting time stamp of each reflected sub acoustic wave, may also refer to an ending time stamp of each reflected sub acoustic wave, may also refer to a time stamp of a certain position (such as a middle position) of each reflected sub acoustic wave and further may also refer to a time stamp range of each reflected sub acoustic wave, etc., which are not limited in this embodiment of this application.

903. Perform filtering and normalization processing on the reflected sub acoustic waves.

In this embodiment, the pre-processing of reflected acoustic waves may improve the reliability of the reflected acoustic waves during the object recognition. The operation for pre-processing the reflected acoustic waves may be set according to experiences, which is not limited in this embodiment of this application. As an example, the operation for pre-processing the reflected acoustic waves includes at least one of filtering, normalization processing, and wavelet transform. In some embodiments, a process for filtering the reflected acoustic waves may be performed by using a filter. In this embodiment of this application, the type of filters is not limited. As an example, the filter is a time-domain filter, a frequency-domain filter, a Kalman filter, etc. In some embodiments, a process for normalizing the reflected acoustic waves may be implemented based on a sliding window.

904. Acquire an image sequence of the object.

In this embodiment, the image sequence may be composed of adjacent video frames in a preset time period, and the preset time period corresponding to this video frame is a time period for echo collection.

905. Determine a time stamp of an image object in the image sequence.

In this embodiment, the time stamp of the image object in the image sequence is to ensure the correspondence between the image and the acoustic waves. Specifically, video data may be regarded as an image stream with a short interval, so that it is captured according to the time stamp to obtain each image frame and its time stamp, and then face capture (face detection, center slicing, etc.) is performed on the image.

906. Perform an augmentation operation on an image.

In a possible implementation, pre-processing the image may be performing the augmentation operation on the image, thus increasing the reliability of the image during the object recognition. In this embodiment of this application, the augmentation operation is not limited. As an example, the augmentation operation includes one or more of rotation, color change, blurring, addition of random noises, central slicing and resolution reduction.

It can be understood that only a part of acoustic wave processing methods or image augmentation methods used in an image processing process are listed. Other feature processing methods (for example, more features are obtained by using continuous wavelet transform) may also be used, and are not limited herein.

907. Align processed reflected sub acoustic waves with processed images to determine a correspondence between the images and the reflected acoustic waves.

The collection frame rate of the reflected sub acoustic waves is different from that of the images in the image sequence. For example, assuming that each reflected sub acoustic wave is a high-frequency acoustic wave fragment of 6 ms, the collection frame rate of the reflected sub acoustic waves is 167 reflected sub acoustic waves per second and the collection frame rate of the images is usually 30-60 images per second. The collection frame rate of the reflected sub acoustic waves is quite different from that of the images in the image sequence. As a result, at least one reflected sub acoustic wave acquired needs to be aligned with at least one image in the image sequence, so as to obtain the reflected sub acoustic waves respectively aligned with all images.

In a possible implementation, a process for aligning at least one reflected sub acoustic wave with at least one image in the image sequence to obtain a reflected sub acoustic wave aligned with the at least one image includes: determining reflected sub acoustic waves respectively aligned with the at least one image according to the time stamp of at least one image in the image sequence and time information of the at least one reflected sub acoustic wave. In a possible implementation, a process for determining reflected sub acoustic waves respectively aligned with the at least one image according to the time stamp of at least one image in the image sequence and time information of the at least one reflected sub acoustic wave includes: for any image, taking reflected sub acoustic waves having time information matched with the time stamp of the any image as the reflected sub acoustic waves aligned with the any image.

There may be one or more reflected sub acoustic waves aligned with any image, which is not limited in this embodiment of this application. There may be or may be no intersections in reflected sub acoustic waves respectively aligned with two adjacent images, which is not limited in this embodiment of this application. When there are no intersections in the reflected sub acoustic waves respectively aligned with the two adjacent images, there may be reflected sub acoustic waves that are not aligned with any image and this part of reflected sub acoustic waves are to be removed.

Conditions for judging whether the time information is matched with the time stamps of the images may be set according to experiences. For example, the conditions for judging whether the time information is matched with the time stamps of the images may include: whether an absolute value of a difference value between the time stamp specified by the time information and the time stamp of the image is not greater than a reference threshold is judged; when the absolute value of the difference value between the time stamp specified by the time information and the time stamp of the image is not greater than the reference threshold, it means that the time information is matched with the time stamp of the image; and when the absolute value of the difference value between the time stamp specified by the time information and the time stamp of the image is greater than the reference threshold, it means that the time information is not matched with the time stamp of the image. When the time information is a time stamp, the time stamp indicated by the time information is this time stamp; and when the time information is a time stamp range, the time stamp indicated by the time information may be a time stamp of a certain reference position (such as a middle position) in the time stamp range. The reference threshold may be set according to experiences and may also be flexibly adjusted according to application scenarios, which is not limited in this embodiment of this application.

In a possible implementation, before alignment, at least one reflected sub acoustic wave and at least one image in the image sequence may be pre-processed, and then the pre-processed at least one reflected sub acoustic wave and the pre-processed at least one image are aligned.

In a possible implementation, pre-processing the image may be performing the augmentation operation on the image, and the augmentation operation is not limited in this embodiment of this application. As an example, the augmentation operation includes one or more of rotation, color change, blurring, addition of random noises, central slicing and resolution reduction. The operation for pre-processing the reflected sub acoustic waves may be set according to experiences, which is not limited in this embodiment of this application. As an example, the operation for pre-processing the reflected sub acoustic waves includes at least one of filtering, normalization processing, and wavelet transform. In some embodiments, a process for filtering the reflected sub acoustic waves may be performed by using a filter. In this embodiment of this application, the type of filters is not limited. As an example, the filter is a time-domain filter, a frequency-domain filter, a Kalman filter, etc. In some embodiments, a process for normalizing the reflected sub acoustic waves may be implemented based on a sliding window.

908. Use an <image, reflected acoustic waves> pair for the same image as a training sample of the object to the recognized.

After reflected sub acoustic waves aligned with at least one image are obtained, for any image, reflected acoustic waves corresponding to any image are formed based on the reflected sub acoustic waves aligned with the any image. In a possible implementation, a method for forming reflected acoustic waves corresponding to the any image based on the reflected sub acoustic waves aligned with the any image includes: splicing the reflected sub acoustic waves aligned with any image according to a sequential order of the time stamp specified by the time information of the reflected sub acoustic waves to obtain the reflected acoustic waves corresponding to the any image. In such way, the reflected acoustic waves corresponding to at least one image respectively may be obtained according to the reflected sub acoustic waves respectively aligned with the at least one image.

After the reflected acoustic waves corresponding to the any image are obtained, any training sample corresponding to any target object is formed based on the any image and the reflected acoustic waves corresponding to the any image. After any training sample corresponding to any target object is formed based on the any image and the reflected acoustic waves corresponding to the any image, the any training sample includes an <image, reflected acoustic waves> pair for the same image from the same target object.

After the reflected acoustic waves corresponding to at least one image respectively are obtained, one training sample corresponding to any target object may be formed based on each image and the reflected acoustic waves corresponding to this image, so as to obtain at least one training sample corresponding to any target object and composed of at least one image.

It can be understood that only single-channel ultrasounds are used for generating a 2D face image in the data collection process. Specifically, when the sound transmission and receiving apparatuses are stationary, the single-channel ultrasounds cannot be used for 2D imaging. In addition, the ultrasounds basically do not contain color information of objects. In this embodiment of this application, with the aid of the capability of the face feature extractor to extract features of key points on a face and the capability to be fitted with a deep neural network, 2D imaging is performed based on single-channel ultrasounds and colored imaging may also be performed. This greatly reduces the cost caused by the need of using a multi-channel ultrasonic apparatus. Therefore, features may be extracted on a common mobile phone having only a single-channel acoustic wave apparatus by using the method in this embodiment of this application.

In this embodiment of this application, imaging may be performed only through single-channel acoustic echoes, such that single-channel echoes on a common mobile phone may also be imaged, the cost is significantly reduced, and the technical applicability is improved.

The collected reflected acoustic waves (echoes) and image sequence are collected and a corresponding pre-processing process is performed, thus ensuring the correspondence and accuracy of the <image, reflected acoustic waves> pair and improving the effectiveness of preset model training.

An object recognition process will be described below by taking an application scenario of Turing shield tether owner recognition as an example. Turing shield tether is an application product of an electronic encryption digital economic entity in payment, which is derived from an underlying program of an Ethereum smart contract. First of all, owner recognition for Turing shield tether based on ultrasonic echoes is briefly described. When a user enters a password or a verification code on a mobile terminal, assuming that the user's face faces a camera at the top of a mobile phone for most time, a receiver at the position of the camera at the top of the mobile phone transmits acoustic waves and a microphone at the position of the camera at the top of the mobile phone is configured to receive the acoustic echoes. After being reported, the acoustic echo data is used for training an identity verification model of the user. The model is configured to identify whether the password is entered by the owner of the mobile phone. The mobile terminal also performs identity verification on the user. The identity verification includes two levels of verification. One level is to verify whether face features of the user are matched with those of a Turing shield tether owner, and the other level is to verify whether a password or verification code entering habit of the user is matched with that of the Turing shield tether owner.

Figure 10:
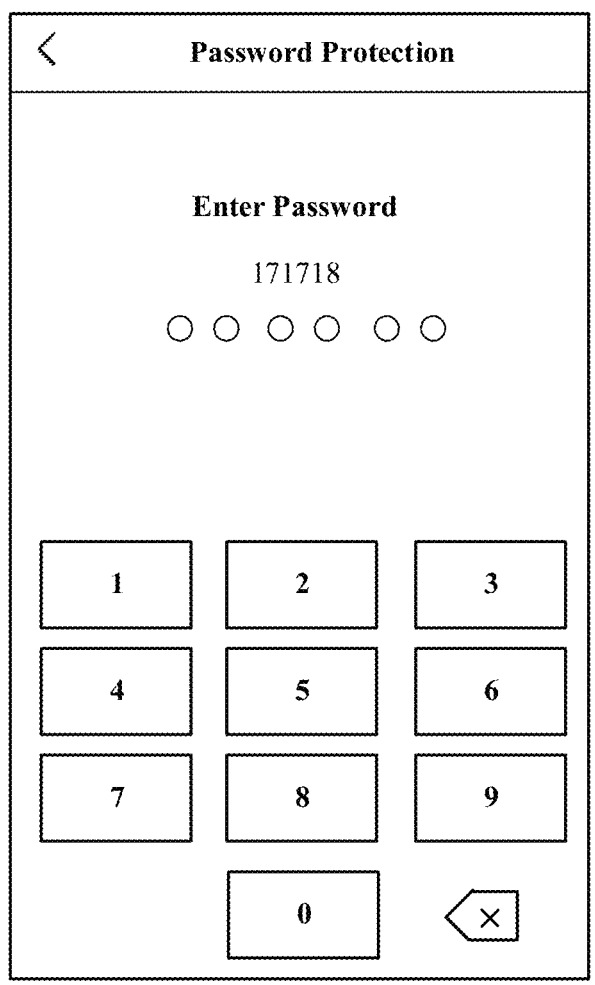
FIG. 10 is the fifth schematic scenario diagram of an object recognition method based on ultrasonic echoes according to an embodiment of this application.

A password entering interface in the Turing shield tether owner recognition process is shown in FIG. 10. In the password entering interface, a password guard test is conducted, and the number of times of tests and successful recognition is counted. The digit string 171718 in FIG. 10 is a given password, and the user needs to enter the given password at a digit entering position. When the user enters a password through a numeric keypad, the mobile terminal collects entering habits of the user, such as the tilt angle of the mobile terminal and the staying time of user's fingers in the entering process. After that, the mobile terminal matches the collected entering habits with pre-stored entering habits of the Turing shield tether owner to verify whether the user's password or verification code entering habits match those of the Turing shield tether owner. While the user enters the password, such process may implement non-inductive object recognition for the user at a relatively low user interaction cost.

Figure 11:
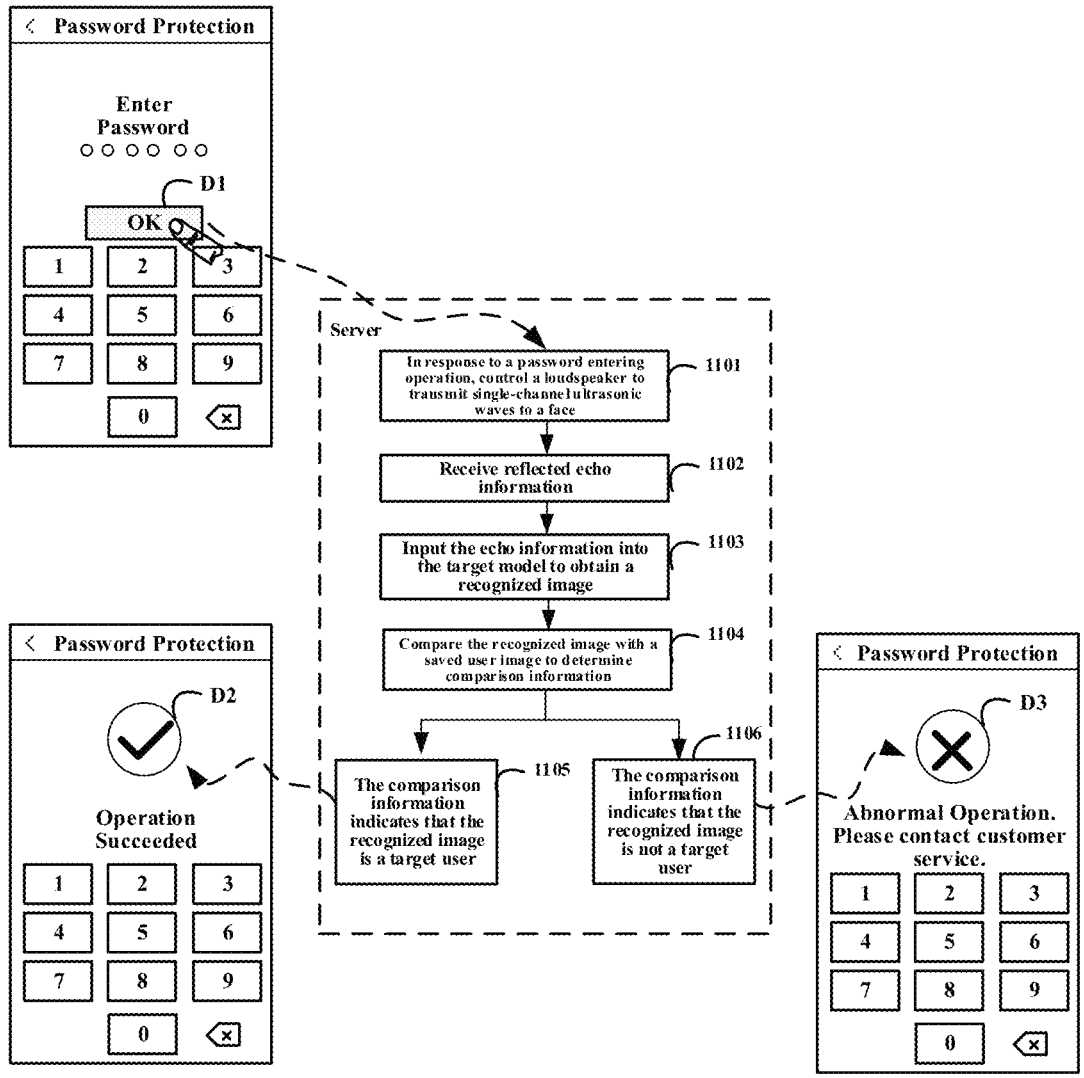
FIG. 11 is the sixth schematic scenario diagram of an object recognition method based on ultrasonic echoes according to an embodiment of this application.

In another possible scenario, in addition to the above process for verifying users, i.e., a scenario for preventing intruders from occupying operation permissions in the background, this application may be used as user verification in the password entering process, which ensures that a performer for entering a password is a target user, as shown in FIG. 11. FIG. 11 shows a flowchart of another object recognition method based on ultrasonic echoes according to an embodiment of this application, including the following steps:

1101. In response to a password entering operation, control a loudspeaker to transmit single-channel ultrasonic waves to a face.

In this embodiment, responding to the password entering operation may be a determination process in the password entering process, when a related password page appears, or after password entering is finished. For example, as shown in FIG. 11, after the user clicks OK (D1), a server will be triggered to perform user verification and password verification processes.

1102. Receive reflected echo information.

In this embodiment, receiving the reflected echo information is a process including: in response to the execution of private operation, calling the acoustic wave transmission apparatus in the terminal to transmit single-channel ultrasonic waves and acquiring the echo signal through an acoustic wave receiving apparatus in the terminal. After that, the echo signal is inputted into the acoustic wave conversion network in the target model to obtain collected acoustic wave features.

1103. Input the echo information into the target model to obtain a recognized image.

In this embodiment, for a recognition process for the echo information, reference is made on the description of step 304 in the embodiment shown in FIG. 3, and details are not described herein.

1104. Compare the recognized image with a saved user image to determine comparison information.

In this embodiment, a comparison process may be performed based on the saved user image, including: acquiring a preset image saved for a target application in the terminal; then, comparing the object image information with the preset image to obtain the comparison information; and further, indicating whether to perform the target application based on the comparison information.

In addition, in order to prevent intruders from using photos or pictures to replace faces to perform the recognition process, location information and depth-of-field information corresponding to the recognized image may be acquired, so as to verify the object based on the location information and the depth-of-field information to determine object recognition information; and further, whether to perform the target application is indicated based on the object recognition information. This is because the echo information contains the corresponding location information and depth-of-field information in a training process, thus avoiding pass of the use of photos or pictures instead of faces for recognition.

1105. The comparison information indicates that the recognized image is a target user.

In this embodiment, if the recognized image is consistent with the user image, it means that an object performing the password operation is the target user, and Operation succeeded (D2) is displayed, as shown in FIG. 11.

1106. The comparison information indicates that the recognized image is not a target user.

In this embodiment, if the recognized image is inconsistent with the user image, it means that an object performing the password operation is not the target user and further identity verification is required, and Abnormal operation (D3) may be displayed, as shown in FIG. 11. The security of private operations such as password entering is ensured by recognizing an operation object in the password entering process.

It can be understood that when the acoustic wave transmission and receiving apparatuses are stationary, the single-channel ultrasonic waves cannot be used for 2D imaging. In addition, the ultrasounds basically do not contain color information of objects. In this embodiment, with the aid of the capability of the face feature extractor to extract features of key points on a face and the capability to be fitted with a deep neural network, 2D imaging is performed based on single-channel acoustic waves and colored imaging may also be performed. This reduces the cost caused by the need of using a multi-channel ultrasonic apparatus. Therefore, features may be extracted on a common mobile phone having only a single-channel acoustic wave apparatus by using the method of this solution.

Figure 12:
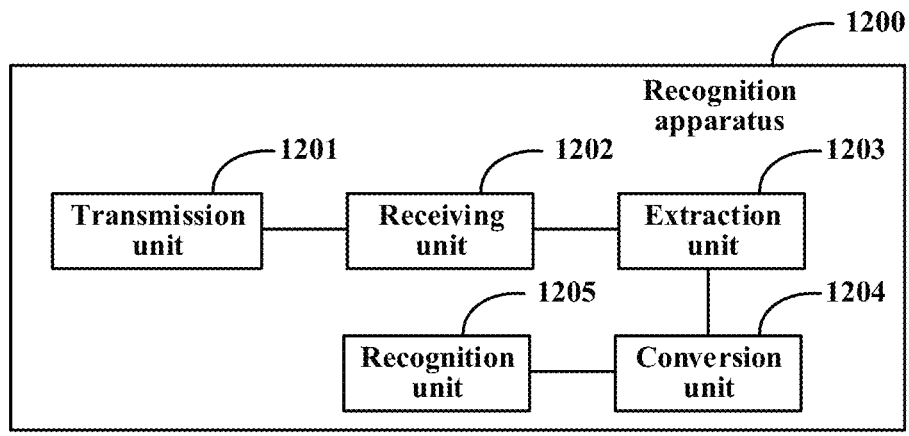
FIG. 12 is a schematic structural diagram of an object recognition apparatus based on ultrasonic echoes according to an embodiment of this application.

To better implement the foregoing solutions of the embodiments of this application, related apparatuses for implementing the foregoing solutions are further provided below. Referring to FIG. 12, FIG. 12 is a schematic structural diagram of an object recognition apparatus based on ultrasonic echoes according to an embodiment of this application, and the recognition apparatus 1200 includes:

a transmission unit 1201 configured to transmit an ultrasonic signal to an object through an acoustic wave transmission apparatus of a terminal;

a receiving unit 1202 configured to receive an echo signal reflected by the object through an acoustic wave receiving apparatus of the terminal, the echo signal corresponding to the ultrasonic signal;

an extraction unit 1203 configured to extract ultrasonic echo feature corresponding to the echo signal;

a conversion unit 1204 configured to call a target model to perform feature dimension conversion on the ultrasonic echo feature, so as to obtain a target dimension feature for characterizing the object; and a recognition unit 1205 configured to perform image translation on the target dimension feature of the object, so as to obtain object image information corresponding to the object.

In some embodiments, in some possible implementations of this application, the recognition unit 1205 is further configured to acquire image training data and echo training data, which are collected for a sample object, the sample object and the object belonging to a same object class;

the recognition unit 1205 is further configured to input the image training data into an image feature extraction network in a preset model to determine an image training feature having a target dimension;

the recognition unit 1205 is further configured to generate corresponding frequency spectrum information based on the echo training data to determine an echo training feature;

the recognition unit 1205 is further configured to input the echo training feature into an acoustic wave conversion network in the preset model for conversion to obtain an acoustic wave training feature having the target dimension;

the recognition unit 1205 is further configured to adjust the acoustic wave training feature by taking the image training feature as a training target to obtain similarity loss; and the recognition unit 1205 is further configured to adjust parameters of the acoustic wave conversion network in the preset model based on the similarity loss, so as to obtain the target model.

In some embodiments, in some possible implementations of this application, the recognition unit 1205 is further configured to set fixed parameters of the image feature extraction network in the preset model; and the recognition unit 1205 is further configured to adjust, in response to setting fixed parameters of the image feature extraction network in the preset model, parameters of the acoustic wave conversion network in the preset model based on the similarity loss, so as to obtain the target model.

In some embodiments, in some possible implementations of this application, the recognition unit 1205 is further configured to acquire pre-training data used for indicating the correspondence between pre-training images and pre-training features; and the recognition unit 1205 is further configured to train the image feature extraction network in the preset model based on the pre-training data to adjust the parameters of the image feature extraction network in the preset model.

In some embodiments, in some possible implementations of this application, the recognition unit 1205 is further configured to control the acoustic wave transmission apparatus to transmit single-channel ultrasonic waves to a sample object based on a preset frequency feature;

the recognition unit 1205 is further configured to receive reflected acoustic wave data according to the acoustic wave receiving apparatus to determine the echo training data;

the recognition unit 1205 is further configured to call, in response to receiving the echo training data, an image collection apparatus in the terminal to collect image training data corresponding to the sample object;

the recognition unit 1205 is further configured to align the echo training data with the image training data based on execution time to generate a training sample pair; and the recognition unit 1205 is further configured to determine the similarity loss based on the training sample pair.

In some embodiments, in some possible implementations of this application, the recognition unit 1205 is further configured to receive reflected undetermined acoustic wave data based on the acoustic wave receiving apparatus;

the recognition unit 1205 is further configured to filter the undetermined acoustic wave data according to the preset frequency feature to determine the acoustic wave data from the undetermined acoustic wave data; and the recognition unit 1205 is further configured to determine the echo training data based on acoustic wave data reflected by the object.

In some embodiments, in some possible implementations of this application, the recognition unit 1205 is further configured to divide the undetermined acoustic wave data into a plurality of fixed-length acoustic sequences according to the preset frequency feature;

the recognition unit 1205 is further configured to filter the acoustic sequences based on a preset filter to obtain filtered sequences; and the recognition unit 1205 is further configured to perform normalization processing on the filtered sequences according to a sliding window to determine the acoustic wave data.

In some embodiments, in some possible implementations of this application, the recognition unit 1205 is further configured to call, in response to receiving the echo training data, the image collection apparatus to collect video streaming corresponding to the sample object;

the recognition unit 1205 is further configured to acquire a time stamp corresponding to each video frame in the video streaming; and the recognition unit 1205 is further configured to align the echo training data with the image training data according to the time stamp to generate the training sample pair.

In some embodiments, in some possible implementations of this application, the transmission unit 1201 is further configured to determine, in response to a recognition instruction, a private operation permission; and the transmission unit 1201 is further configured to call the acoustic wave transmission apparatus based on the private operation permission to transmit single-channel ultrasonic waves by the acoustic wave transmission apparatus.

In some embodiments, in some possible implementations of this application, the recognition unit 1205 is further configured to acquire a preset image saved in a target application, the target application corresponding to the target model;

the recognition unit 1205 is further configured to compare the object image information with the preset image to obtain comparison information; and the recognition unit 1205 is further configured to indicate whether to perform the target application based on the comparison information.

In some embodiments, in some possible implementations of this application, the object image information is face image information, and the recognition unit 1205 is further configured to acquire location information and depth-of-field information corresponding to the face image information;

the recognition unit 1205 is further configured to verify the object based on the location information and the depth-of-field information to determine object recognition information; and the recognition unit 1205 is further configured to indicate whether to perform the target application based on the object recognition information.

The recognition apparatus transmits an ultrasonic signal to an object through an acoustic wave transmission apparatus of a terminal; then receives an echo signal reflected by the object through an acoustic wave receiving apparatus of the terminal, the echo signal corresponding to the ultrasonic signal; further performs vector normalization processing on the echo signal to extract an ultrasonic echo feature corresponding to the echo signal; calls a target model to perform feature dimension conversion on the ultrasonic echo feature, so as to obtain a target dimension feature for characterizing the object; and further, performs face translation processing on the target dimension feature of the object, so as to obtain face image information corresponding to the object. Compared with image collection in which accurate imaging may be implemented with sufficient ambient light, the transmission of ultrasonic signals and the reception of reflected echo signals are less sensitive to the changes of scenarios. In various scenarios where image collection is applicable or not, physical information carried by ultrasonic echoes can be accurately translated into the object image information of the object, thereby ensuring the accuracy of object recognition and improving the security of the terminal.

Figure 13:
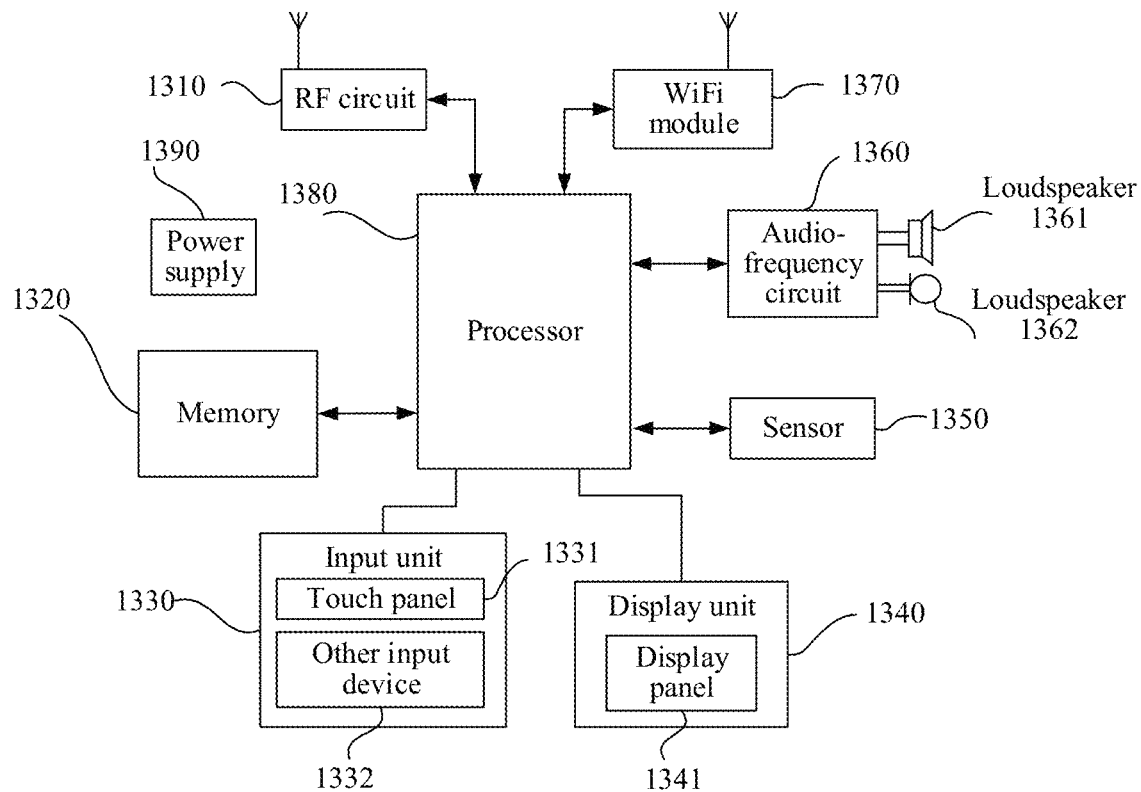
FIG. 13 is a schematic structural diagram of a terminal device according to an embodiment of this application.

An embodiment of this application further provides a terminal device. FIG. 13 is a schematic structural diagram of another terminal device according to an embodiment of this application. For ease of description, only parts related to the embodiments of this application are shown. For specific technical details that are not disclosed, refer to the method part in the embodiments of this application. The terminal device may be any terminal device including a mobile phone, a tablet computer, a personal digital assistant (PDA), a point of sales (POS), and an on-board computer, and the terminal device being a mobile phone is used as an example.

FIG. 13 shows a block diagram of a partial structure of a mobile phone related to the terminal device according to this embodiment of this application. Referring to FIG. 13, the mobile phone includes: a radio frequency (RF) circuit 1310, a memory 1320, an input unit 1330, a display unit 1340, a sensor 1350, an audio circuit 1360, a wireless fidelity (WiFi) module 1370, a processor 1380, a power supply 1390, etc. A person skilled in the art may understand that the structure of the mobile phone shown in FIG. 13 does not constitute any limitation on the mobile phone, and instead, the mobile phone may include more or fewer components than those shown in the figure, or some components may be combined, or a different component deployment may be used.

The following makes a detailed description of the components of the mobile phone with reference to FIG. 13.

The RF circuit 1310 may be configured to send and receive a signal in an information receiving and sending process or a call process, and in particular, after downlink information of a base station is received, send the downlink information to the processor 1380 for processing. In addition, uplink data is sent to the base station.

The memory 1320 may be configured to store a software program and a module. The processor 1380 runs the software program and the module that are stored in the memory 1320, to implement various functional applications and data processing of the mobile phone.

The input unit 1330 may be configured to receive input digit or character information, and generate a keyboard signal input related to the user setting and function control of the mobile phone. Specifically, the input unit 1330 may include a touch panel 1331 and another input device 1332.

The display unit 1340 may be configured to display information inputted by the user or information provided for the user, and various menus of the mobile phone. The display unit 1340 may include a display panel 1341. In some embodiments, the display panel 1341 may be configured by using a liquid crystal display (LCD), an organic light-emitting diode (OLED), or the like.

The mobile phone may further include at least one sensor 1350 such as an optical sensor, a motion sensor, and other sensors.

The audio circuit 1360, a speaker 1361, and a microphone 1362 may provide audio interfaces between a user and the mobile phone.

The processor 1380 is a control center of the mobile phone, and is connected to various parts of the entire mobile phone by using various interfaces and lines. By running or executing a software program and/or module stored in the memory 1320, and invoking data stored in the memory 1320, the processor 1380 executes various functions of the mobile phone and performs data processing.

Specifically, the processor 1380 is further configured to transmit an ultrasonic signal to an object through an acoustic wave transmission apparatus of a terminal;

the processor 1380 is further configured to receive an echo signal reflected by the object through an acoustic wave receiving apparatus of the terminal, the echo signal corresponding to the ultrasonic signal;

the processor 1380 is further configured to extract ultrasonic echo feature corresponding to the echo signal;

the processor 1380 is further configured to call a target model to perform feature dimension conversion on the ultrasonic echo feature, so as to obtain a target dimension feature for characterizing the object; and the processor 1380 is further configured to perform image translation on the target dimension feature of the object, so as to obtain object image information corresponding to the object.

Echo Training Features

Figure 14:
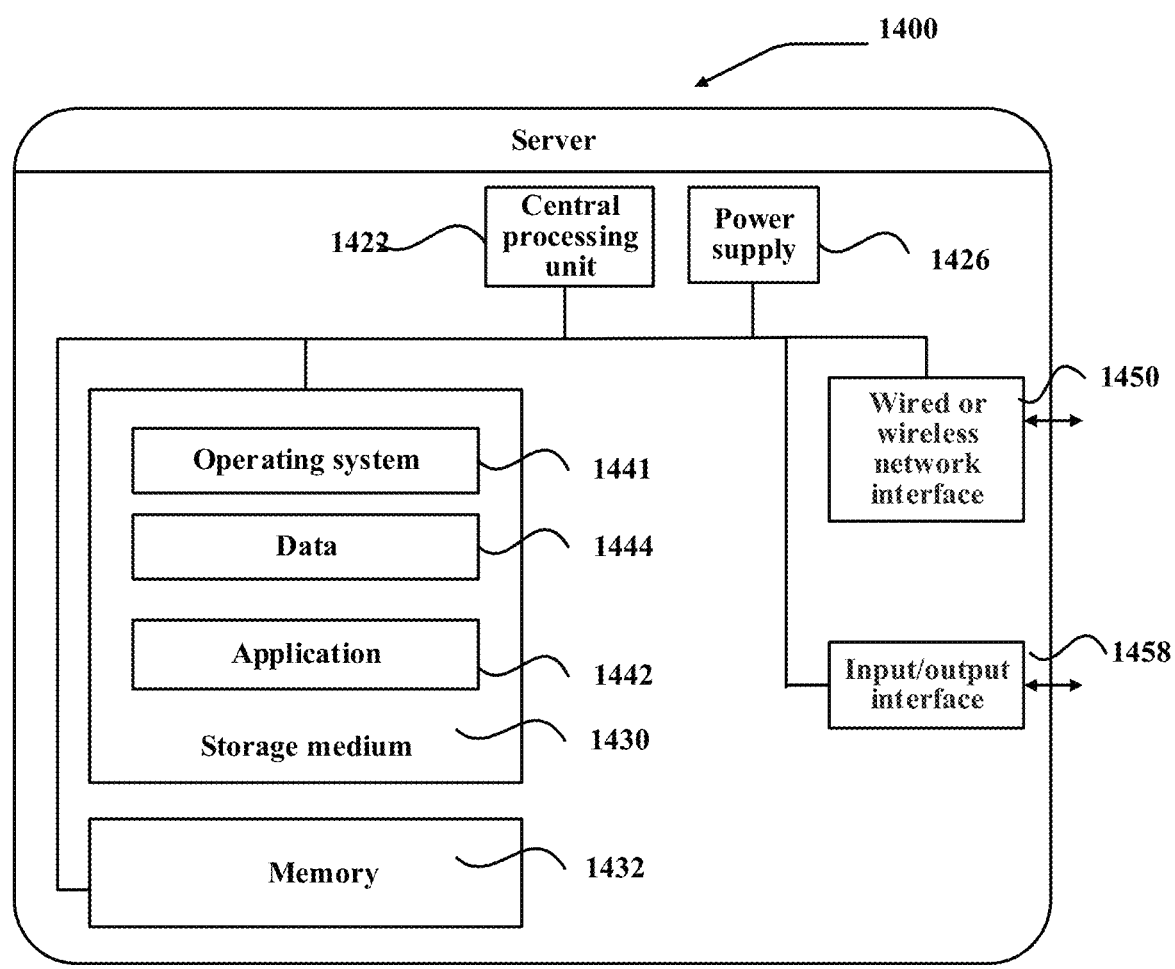
FIG. 14 is a schematic structural diagram of a server according to an embodiment of this application.

An embodiment of this application further provides a server. FIG. 14 is a schematic structural diagram of a server according to an embodiment of this application. The server 1400 may vary greatly due to different configurations or performance, and may include one or more central processing units (CPU) 1422 (for example, one or more processors) and a memory 1432, and one or more storage media 1430 (for example, one or more mass storage devices) that store applications 1442 or data 1444. The memory 1432 and the storage medium 1430 may implement transient storage or permanent storage. The program stored in the storage medium 1430 may include one or more modules (not shown in the figure), and each module may include a series of instruction operations on the server. Furthermore, the CPU 1422 may be configured to communicate with the storage medium 1430 to perform the series of instruction operations in the storage medium 1430 on the server 1400.

The server 1400 may further include one or more power supplies 1426, one or more wired or wireless network interfaces 1450, one or more input/output interfaces 1458, and/or, one or more operating systems 1441, for example, Windows Server™, Mac OS X™, Unix™, Linux™, and FreeBSD™.

The server 1400 is configured to train the target model and perform a recognition process after the training. The training process includes: firstly, using the pre-trained face feature extractor to perform feature processing on a face image after inputting part of <acoustic waves, face image> pairs processed by dimension, so as to obtain a high-dimensional face feature used as a training target; at the same time, processing an ultrasonic echo signal (for example, generating a spectrogram, etc.) and processing same to obtain frequency-domain and time-domain information; inputting the information into the acoustic wave conversion network and converting same into a high-dimensional acoustic wave feature; comparing the high-dimensional acoustic wave feature with the above processed high-dimensional face feature to minimize the difference therebetween; and then, inputting the extracted high-dimensional acoustic wave feature into the face image translator to obtain a restored face.

It can be understood that the face feature extractor processes an inputted image into high-dimensional features, the face image translator reconstructs a face image by using the features, and the acoustic wave conversion network processes the acoustic waves into vectors having the same dimensions as the face features. In addition, the difference between two variables is calculated through the similarity loss and the acoustic wave conversion network is updated through back-propagation.

Parts capable of being trained in the target model mainly include the acoustic wave conversion network. In addition, other parts (such as the face feature extractor and the face image translator) are directly used after pre-training with additional data sets, and remain fixed in the model training process. In addition, data samples used for training and data used for tests are different, and trainings and test sets are ensured to be not overlapped, thus avoiding the occurrence of information disclosure.

The steps performed by the management apparatus in the foregoing embodiment may be based on the structure of the server shown in FIG. 14.

An embodiment of this application further provides a computer-readable storage medium, which stores an object recognition instruction based on ultrasonic echoes. While running on a computer, the object recognition instruction enables the computer to perform steps that are performed by the object recognition apparatus based on ultrasonic echoes in the method described in the embodiments as shown in FIG. 3 to FIG. 11 above.

An embodiment of this application further provides a computer program product including an object recognition instruction based on ultrasonic echoes. While running on a computer, the computer program product enables the computer to perform steps that are performed by an object recognition apparatus based on ultrasonic echoes in the method described in the embodiments as shown in FIG. 3 to FIG. 11 above.

An embodiment of this application further provides an object recognition system based on ultrasonic echoes. The object recognition system based on ultrasonic echoes may include an object recognition apparatus based on ultrasonic echoes according to the embodiment shown in FIG. 12, a terminal device according to the embodiment shown in FIG. 13, or a server shown in FIG. 14.

A person skilled in the art can clearly understand that for convenience and conciseness of description, for specific working processes of the foregoing described system, apparatus and unit, refer to the corresponding processes in the foregoing method embodiments, and details are not described herein.

In the several embodiments provided in this application, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a computer storage medium and includes several instructions for instructing a computer device (which may be a personal computer, an object recognition apparatus based on ultrasonic echoes, a network device, or the like) to perform all or some of the steps of the methods described in the embodiments of this application. In addition, the above storage medium includes: any medium that can store program code, such as a USB flash drive, a removable hard disk, a read-only memory (ROM), a RAM, a magnetic disk, a compact disc, or the like.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An object recognition method based on ultrasonic echoes, performed by a computer device, the method comprising:
   receiving an echo signal reflected by an object and captured by a terminal in response to an activation of an application on the terminal, the echo signal corresponding to an ultrasonic signal transmitted by the terminal to the object;
   extracting an ultrasonic echo feature corresponding to the echo signal, further including:
      generating frequency spectrum information corresponding to the echo signal; and
      processing the frequency spectrum information to obtain frequency-domain and time-domain information; and
   performing feature dimension conversion on the ultrasonic echo feature using an acoustic wave conversion network to obtain a target dimension feature for characterizing the object, further including:
      inputting the frequency-domain and time-domain information into the acoustic wave conversion network to obtain high-dimensional acoustic wave feature corresponding to the echo signal as the target dimension feature, wherein the acoustic wave conversion network is trained by:
         transmitting single-channel ultrasonic waves to a sample object based on a preset frequency feature;
         receiving reflected acoustic wave data from the sample object to determine echo training data;
         collecting image training data corresponding to the sample object,
         aligning the echo training data with the image training data based on execution time to generate a training sample pair;
         determining a similarity loss based on the training sample pair; and
         adjusting the acoustic wave conversion network according to the similarity loss;
   performing image translation on the high-dimensional acoustic wave feature corresponding to the echo signal to obtain object image information corresponding to the object;
   acquiring a preset image associated with a user account of the application;
   comparing the object image information with the preset image to obtain comparison information; and
   performing a predefined operation on the application when the comparison information indicates that the object image information matches the preset image.

2. The method according to claim 1, wherein the method comprises:
   in response to a recognition instruction, determining a private operation permission; and
   transmitting single-channel ultrasonic waves based on the private operation permission.

3. The method according to claim 1, wherein the object image information is face image information, and the method further comprises:
   acquiring location information and depth-of-field information corresponding to the face image information;
   verifying the object based on the location information and the depth-of-field information to determine object recognition information; and
   indicating whether to perform the target application based on the object recognition information.

4. The method according to claim 1, wherein the ultrasonic signal is a single-channel ultrasonic wave, and the terminal is a mobile phone having a loudspeaker for acoustic wave transmission and a microphone for acoustic wave reception.

5. A computer device, comprising a processor and a memory;
   the memory being configured to store program code; and
   the processor being configured to perform an object recognition method based on ultrasonic echoes by executing instructions in the program code, the method including:
      receiving an echo signal reflected by an object and captured by a terminal in response to an activation of an application on the terminal, the echo signal corresponding to an ultrasonic signal transmitted by the terminal to the object;
      extracting an ultrasonic echo feature corresponding to the echo signal, further including:
         generating frequency spectrum information corresponding to the echo signal; and
         processing the frequency spectrum information to obtain frequency-domain and time-domain information; and
      performing feature dimension conversion on the ultrasonic echo feature using an acoustic wave conversion network to obtain a target dimension feature for characterizing the object, further including:
         inputting the frequency-domain and time-domain information into the acoustic wave conversion network to obtain high-dimensional acoustic wave feature corresponding to the echo signal as the target dimension feature, wherein the acoustic wave conversion network is trained by:
- transmitting single-channel ultrasonic waves to a sample object based on a preset frequency feature;
- receiving reflected acoustic wave data from the sample object to determine echo training data;
- collecting image training data corresponding to the sample object,
- aligning the echo training data with the image training data based on execution time to generate a training sample pair;
- determining a similarity loss based on the training sample pair; and
- adjusting the acoustic wave conversion network according to the similarity loss;

performing image translation on the high-dimensional acoustic wave feature corresponding to the echo signal to obtain object image information corresponding to the object;

acquiring a preset image associated with a user account of the application;

comparing the object image information with the preset image to obtain comparison information; and performing a predefined operation on the application when the comparison information indicates that the object image information matches the preset image.

6. The computer device according to claim 5, wherein the method comprises:
- in response to a recognition instruction, determining a private operation permission; and
- transmitting single-channel ultrasonic waves based on the private operation permission.

7. The computer device according to claim 5, wherein the object image information is face image information, and the method further comprises:
- acquiring location information and depth-of-field information corresponding to the face image information;
- verifying the object based on the location information and the depth-of-field information to determine object recognition information; and
- indicating whether to perform the target application based on the object recognition information.

8. The computer device according to claim 5, wherein the ultrasonic signal is a single-channel ultrasonic wave, and the terminal is a mobile phone having a loudspeaker for acoustic wave transmission and a microphone for acoustic wave reception.

9. A non-transitory computer-readable storage medium, storing instructions, the instructions, when executed by a processor of a computer device, causing the computer device to perform an object recognition method based on ultrasonic echoes including:
- receiving an echo signal reflected by an object and captured by a terminal in response to an activation of an application on the terminal, the echo signal corresponding to an ultrasonic signal transmitted by the terminal to the object;
- extracting an ultrasonic echo feature corresponding to the echo signal, further including:
  - generating frequency spectrum information corresponding to the echo signal; and
  - processing the frequency spectrum information to obtain frequency-domain and time-domain information; and
- performing feature dimension conversion on the ultrasonic echo feature using an acoustic wave conversion network to obtain a target dimension feature for characterizing the object, further including:
  - inputting the frequency-domain and time-domain information into the acoustic wave conversion network to obtain high-dimensional acoustic wave feature corresponding to the echo signal as the target dimension feature, wherein the acoustic wave conversion network is trained by:
    - transmitting single-channel ultrasonic waves to a sample object based on a preset frequency feature;
    - receiving reflected acoustic wave data from the sample object to determine echo training data;
    - collecting image training data corresponding to the sample object,
    - aligning the echo training data with the image training data based on execution time to generate a training sample pair;
    - determining a similarity loss based on the training sample pair; and
    - adjusting the acoustic wave conversion network according to the similarity loss;

performing image translation on the high-dimensional acoustic wave feature corresponding to the echo signal to obtain object image information corresponding to the object;

acquiring a preset image associated with a user account of the application;

comparing the object image information with the preset image to obtain comparison information; and performing a predefined operation on the application when the comparison information indicates that the object image information matches the preset image.

10. The non-transitory computer-readable storage medium according to claim 9, wherein the method comprises:
- in response to a recognition instruction, determining a private operation permission; and
- transmitting single-channel ultrasonic waves based on the private operation permission.

11. The non-transitory computer-readable storage medium according to claim 9, wherein the object image information is face image information, and the method further comprises:
- acquiring location information and depth-of-field information corresponding to the face image information;
- verifying the object based on the location information and the depth-of-field information to determine object recognition information; and
- indicating whether to perform the target application based on the object recognition information.

12. The non-transitory computer-readable storage medium according to claim 9, wherein the ultrasonic signal is a single-channel ultrasonic wave, and the terminal is a mobile phone having a loudspeaker for acoustic wave transmission and a microphone for acoustic wave reception.

* * * * *